(12) United States Patent
Noerenberg

(10) Patent No.: US 9,429,227 B2
(45) Date of Patent: Aug. 30, 2016

(54) PLANETARY GEARBOX WITH INTEGRAL SERVICE BRAKE

(71) Applicant: FAIRFIELD MANUFACTURING COMPANY, INC., Lafayette, IN (US)

(72) Inventor: Ryan L Noerenberg, Otterbein, IN (US)

(73) Assignee: FAIRFIELD MANUFACTURING COMPANY, INC., Lafayette, IN (US)

( * ) Notice: Subject to any disclaimer, the term of this patent is extended or adjusted under 35 U.S.C. 154(b) by 97 days.

(21) Appl. No.: 14/184,472

(22) Filed: Feb. 19, 2014

(65) Prior Publication Data

US 2015/0233467 A1    Aug. 20, 2015

(51) Int. Cl.
| | |
|---|---|
| *F16H 57/10* | (2006.01) |
| *B60T 1/06* | (2006.01) |
| *B60K 17/04* | (2006.01) |
| *F16D 55/40* | (2006.01) |
| *B60K 7/00* | (2006.01) |

(52) U.S. Cl.
CPC ............. *F16H 57/10* (2013.01); *B60K 17/046* (2013.01); *B60T 1/062* (2013.01); *F16D 55/40* (2013.01); *B60K 7/0015* (2013.01)

(58) Field of Classification Search
None
See application file for complete search history.

(56) References Cited

U.S. PATENT DOCUMENTS

| | | |
|---|---|---|
| 3,998,295 A | 12/1976 | Martin |
| 4,010,830 A | 3/1977 | Logus et al. |
| 4,064,973 A | 12/1977 | Deem et al. |
| 4,173,269 A | 11/1979 | Craig |
| 4,279,330 A | 7/1981 | Pottorff et al. |
| 4,498,560 A | 2/1985 | Purdy |
| 4,562,903 A | 1/1986 | Rogier |
| 4,742,895 A | 5/1988 | Bok |
| 4,798,269 A | 1/1989 | Lindner et al. |
| 4,845,468 A | 7/1989 | Stark |
| 4,890,699 A | 1/1990 | Megginson et al. |
| 5,046,590 A | 9/1991 | Trema |
| 5,050,939 A | 9/1991 | Middelhoven et al. |
| 5,174,420 A | 12/1992 | DeWald et al. |
| 5,228,543 A | 7/1993 | Heidenreich |
| 5,253,735 A | 10/1993 | Larson et al. |
| 5,525,115 A * | 6/1996 | Vanzini ............... F16H 3/54 475/118 |
| 5,551,534 A | 9/1996 | Smithberger et al. |
| 5,601,160 A | 2/1997 | Horsch |
| 5,685,398 A | 11/1997 | Marshall et al. |

(Continued)

FOREIGN PATENT DOCUMENTS

EP    2568199 A1    3/2013

OTHER PUBLICATIONS

European Patent Office, Extended European Search Report, Oct. 7, 2015, pp. 1-6, Application No. 14195417.2, Applicant: Fairfield Manufacturing Company, Inc.

*Primary Examiner* — Colby M Hansen
(74) *Attorney, Agent, or Firm* — Woodling, Krost and Rust

(57) ABSTRACT

A planetary gearbox with substantial speed reduction includes a stationary spindle, an integral service brake, and a parking brake. The integral service brake resides radially outwardly with respect to the parking brake in a stacked arrangement such that axial space is conserved yielding an axially short and compact gearbox. An oil passageway extends radially through the spindle. A rotating input shaft drives the planetary gearbox and produces an output in the form of a rotatable housing/hub. The service brake rotors have a large surface area and are keyed to the rotatable hub enabling efficient brake cooling and efficacious brake performance in a compact arrangement.

26 Claims, 22 Drawing Sheets

(56) References Cited

U.S. PATENT DOCUMENTS

| | | |
|---|---|---|
| 6,019,199 A | 2/2000 | Heidenreich |
| 6,073,731 A | 6/2000 | Ieda |
| 6,101,921 A | 8/2000 | Granberg et al. |
| 6,109,166 A | 8/2000 | Granberg |
| 6,116,383 A | 9/2000 | Bissonnette et al. |
| 6,142,262 A | 11/2000 | Bissonnette et al. |
| 6,145,635 A | 11/2000 | White |
| 6,152,269 A * | 11/2000 | Malvestio ............... B60T 1/065 188/106 P |
| 6,170,616 B1 | 1/2001 | White |
| 6,260,668 B1 | 7/2001 | McClanahan |
| 6,264,009 B1 | 7/2001 | Johnson |
| 6,386,332 B1 | 5/2002 | Daniel |
| 6,481,541 B2 | 11/2002 | Taki et al. |
| 6,481,542 B2 | 11/2002 | Giering et al. |
| 6,508,336 B1 | 1/2003 | El-Kassouf |
| 6,543,596 B2 | 4/2003 | Martin et al. |
| 6,550,588 B2 | 4/2003 | Hinton et al. |
| 6,585,088 B1 | 7/2003 | Fontaine et al. |
| 6,588,551 B1 | 7/2003 | Kammerer et al. |
| 6,766,884 B2 | 7/2004 | Parsons et al. |
| 6,772,863 B2 | 8/2004 | Jessen et al. |
| 6,907,962 B2 | 6/2005 | Forster |
| 6,997,291 B2 | 2/2006 | Boisseau |
| 7,059,453 B2 | 6/2006 | Yamamoto et al. |
| 7,121,389 B2 | 10/2006 | Manrao et al. |
| 7,134,532 B2 | 11/2006 | Baumgartner et al. |
| 7,380,643 B2 | 6/2008 | Grimm et al. |
| 7,424,358 B2 | 9/2008 | Baumgartner |
| 7,493,992 B2 | 2/2009 | Rogers |
| 7,506,730 B2 | 3/2009 | Strandberg et al. |
| 7,686,607 B2 | 3/2010 | Dantlgraber |
| 7,849,976 B2 | 12/2010 | Kawahara et al. |
| 7,861,831 B2 | 1/2011 | Chung |
| 7,866,447 B2 | 1/2011 | Baumgartner et al. |
| 7,900,751 B2 | 3/2011 | Walker et al. |
| 7,900,752 B2 | 3/2011 | Mayberry et al. |
| 7,909,147 B1 | 3/2011 | Schnell |
| 8,662,277 B2 | 3/2014 | Schoon |
| 2002/0045510 A1 | 4/2002 | Damm et al. |
| 2005/0031460 A1 | 2/2005 | Perry |
| 2005/0166751 A1 | 8/2005 | Mark |
| 2005/0173976 A1 | 8/2005 | Mies |
| 2006/0097565 A1 | 5/2006 | Mies |
| 2006/0201321 A1 | 9/2006 | Loedige et al. |
| 2006/0266419 A1 | 11/2006 | Krug-Kussius |
| 2007/0020354 A1 | 1/2007 | Dantlgraber |
| 2007/0051100 A1 | 3/2007 | Kauss |
| 2008/0050464 A1 | 2/2008 | Dantlgraber |
| 2008/0190103 A1 | 8/2008 | Behm |
| 2008/0250781 A1 | 10/2008 | Mueller et al. |
| 2008/0262688 A1 | 10/2008 | Behm |
| 2008/0295507 A1 | 12/2008 | Mueller et al. |
| 2008/0314664 A1 | 12/2008 | Mueller et al. |
| 2009/0008174 A1 | 1/2009 | Tikkanen et al. |
| 2009/0036248 A1 | 2/2009 | Mueller et al. |
| 2009/0084102 A1 | 4/2009 | Mueller et al. |
| 2010/0269496 A1 | 10/2010 | Mueller et al. |

* cited by examiner

PLANETARY GEARBOX WITH INTEGRAL SERVICE BRAKE

FIELD OF THE INVENTION

This invention is in the field of a planetary gearbox with an integral service brake.

BACKGROUND OF THE INVENTION

Many off-highway machines are driven by hydraulic motors mounted to planetary wheel drives. Some of these vehicles are capable of speeds of up to 35-40 miles/hour. Due to the large mass of these machines and their relatively high speed, braking is a very important function.

Braking is usually categorized in two ways: service (dynamic) braking and parking (static braking). On many high-speed off-highway machines, the service braking is handled by a combination of back-driving the hydraulic system and actuating a disc-caliper system on the output of the planetary wheel drive. Parking braking is usually done with a multi-disc wet brake at the input of the planetary wheel drive. This brake is usually spring-applied and released with hydraulic charge pressure.

There are shortcomings of a disc-caliper service braking system on high-speed off-highway hydraulic machines, namely:

due to the potential large momentum associated with these machines an external output disc-caliper service brake needs to be very large, which makes it a costly feature;

an output disc-caliper service brake is exposed to the environment, the environment for many of these machines can be severe and highly corrosive to a brake disc;

disc-caliper brakes also add considerable mass to a fairly weight sensitive application; and, for low to moderate braking, the hydrostatic system is used almost exclusively, this prevents the corrosion from being "wiped off" frequently by the caliper.

There are also shortcomings to wet, multi-disc input/intermediate service brakes, namely:

braking torque is transferred through gearing; and, the brake becomes inherently long due to limitations in diameter and energy capacity needs;

To avoid making the assembly longer with input/intermediate brakes, the design would be compromised:

this would result in a recommendation of one-time use only before replacement;

may also result in limiting machine speed to reduce the potential energy that the brake may encounter; and, the linear velocity of the disc pack is also increased (relative to the velocity of an output brake), this would be a large contributing factor in heat generated within an assembly and would be another reason to decrease machine speed.

SUMMARY OF THE INVENTION

A planetary gearbox with integral service brake and with integral parking brake is disclosed and claimed. The device includes a stationary spindle, a service brake, and a parking brake. The service brake resides radially outwardly with respect to the parking brake. A first oil passageway extends radially from the parking brake to the service brake.

The service brake operates between the output gear housing which is at or near the radial extent of the device and a stationary spindle. The stator and rotor discs of the service brake has large surface areas because they reside generally toward the radial extent of the device and have large outside diameters and relatively small inside diameters. Additionally, the planetary gearbox provides a large gear reduction resulting in a slow rotation of the output gear housing on the order of 20-30:1. Thus, the output gear housing rotates slowly which prevents the brake from generating excess heat. Still additionally, the rotors and stators used have slits which guide the lubricating oil through the rotors and stators of the service brake. A planetary gear system and a rotating shaft are coupled to the planetary gear system. The planetary gear system drives a rotatable ring gear housing. The service brake operates between the stationary spindle and the rotatable ring gear housing. The parking brake operates between the stationary spindle and the rotating shaft coupled to the planetary gear system. The planetary gear system includes an input stage and an output stage.

The parking brake includes rotor discs and stator discs. The first oil passageway extends radially from the parking brake to the service brake and resides in the stationary spindle. The first oil passageway extends radially from the parking brake to the service brake and transfers oil from the parking brake to the service brake due to the rotary motion of the rotating shaft and the rotors of the parking brake. The first and second oil passageways reside in the stationary spindle slightly above the oil fill line (the level of the reservoir). However, the first and second oil passageways can have other orientations in the stationary spindle.

The second oil passageway extends radially from the parking brake to the service brake. The second oil passageway resides in the stationary spindle. The second oil passageway extends radially from the parking brake to the service brake and transfers oil from the parking brake to the service brake due to the rotary motion of the rotating shaft and the rotors of the parking brake.

An intermediate hub is affixed to the rotatable ring gear housing. The service brake includes service brake rotor discs affixed to the intermediate hub and rotatable therewith. The service brake includes service brake stator discs affixed to the stationary spindle. An input drive shaft and an input sun gear are coupled together. A coupling interconnects the input drive shaft and the input sun gear. The parking brake includes parking brake rotor discs affixed to the coupling and rotatable therewith. The parking brake further includes parking brake stator discs affixed to the stationary spindle.

The service brake stator and rotor discs comprise a service brake disc stack. A spring-loaded service piston insures disengagement of the service brake disc stack with no pressure applied to the piston. In other words, the service brake spring constantly applies force to the service brake piston such that the service brake is normally "off" which "unlocks" the intermediate hub and the output ring gear housing from the stationary spindle. Still, in further words, the service brake spring urges the service brake piston such that the outer rotational components (the intermediate hub and the output ring gear housing) are not connected to ground (with ground being the stationary spindle).

Upon the application of hydraulic pressure to the service brake piston cavity, the pressure compresses the spring which causes the piston to engage the rotor and stator discs of the service brake stack locking the rotational components to ground.

Further, the parking brake stator and rotor discs comprise a parking brake disc stack. A spring-loaded brake piston engages the parking brake disc stack when no hydraulic pressure is applied to the piston. In other words, the parking brake spring constantly applies force to the parking brake piston such that the parking brake is normally "on" which "locks" the coupling and the input shaft to the stationary spindle. Still, in further words, the parking brake spring urges the parking brake piston such that the coupling and the input shaft are connected to ground with ground being the stationary spindle. Upon the application of pressure to the parking brake piston cavity, the spring is compressed and the parking brake piston disengages the brake stack.

The invention can be alternately described as including a stationary spindle, a service brake, and a planetary gear system. A rotating shaft is coupled to the planetary gear system and, the rotating shaft drives the planetary gear system. The planetary gear system drives a rotatable ring gear housing, and, the rotatable ring gear housing includes a hub. A first oil passageway in the stationary spindle extends radially providing oil to the service brake. The service brake operates between and engages the stationary spindle and the rotatable ring gear housing including the hub. Further, a parking brake provides oil to the first oil passageway in the stationary spindle extending radially to the service brake when the parking brake is not active (when the parking brake is off).

Still additionally, the planetary gearbox with integral service brake includes a parking brake having rotor discs and stator discs. The rotor discs of the parking brake provide oil to the first oil passageway in the stationary spindle which extends radially to the service brake when the parking brake is not active.

The planetary gearbox with integral service brake further includes an oil reservoir and the spindle includes an oil return passageway. There are actually three oil return passageways in the spindle illustrated herein. However, the number of oil return passageways may be different depending in other spindles. A service piston is used for applying the service brake. A third oil passageway is formed between the service piston and the hub of the ring gear housing. A main bearing resides between the stationary spindle and the hub of the ring gear housing. The service brake provides oil to the third oil passageway formed between the service piston and the hub of the ring gear housing. The main bearing pumps oil from the third oil passageway to the oil return passageway into the oil reservoir.

The rotor discs of the parking brake provide oil to the first oil passageway in the stationary spindle which extends radially to the service brake when the parking brake is not active. A second oil passageway in the stationary spindle extends radially and provides oil to the service brake when the parking brake is not active. The rotor discs of the parking brake also provide oil to the second oil passageway in the stationary spindle which extends radially to the service brake when the parking brake is not active.

The service brake stator and rotor discs comprise a service brake disc stack. A pressure operated spring-loaded service brake piston engages the service brake disc stack upon the application of pressure to the piston. The parking brake stator and rotor discs comprise a parking brake disc stack. A spring-loaded parking brake piston engages the parking brake disc stack upon the application of pressure to the piston.

The planetary gearbox, stationary spindle and integral service brake have a common axis. The service brake includes rotor discs and stator discs each of which include an outer diameter and an inner diameter. The discs include a large surface area as determined by the inner and outer diameters of the rotor discs and the stator discs with respect to the common axis, respectively. The service brake resides radially outwardly with respect to said common axis.

Either the rotor discs or the stator discs of the service brake include friction material thereon. The discs include first and second side surfaces, and, the discs include grooves therein for more efficient use of lubricating oil and heat dissipation.

The instant invention seeks to internalize the service braking while designing the brake at the output of the gearbox. This protects the brake from the environment while overcoming the disadvantages of external output service brakes and internal/intermediate multi-disc wet brakes. The challenge in doing this is to find a way to package the brake without increasing the length of the assembly. Given a common application for this invention is agricultural sprayers, the overall length of the assembly is critical. As the assembly increases in length, there is additional crop disturbance as the machine drives through fields. There are standard crop row widths that the assembly must operate within.

DESCRIPTION OF THE INVENTION

Figure 1:
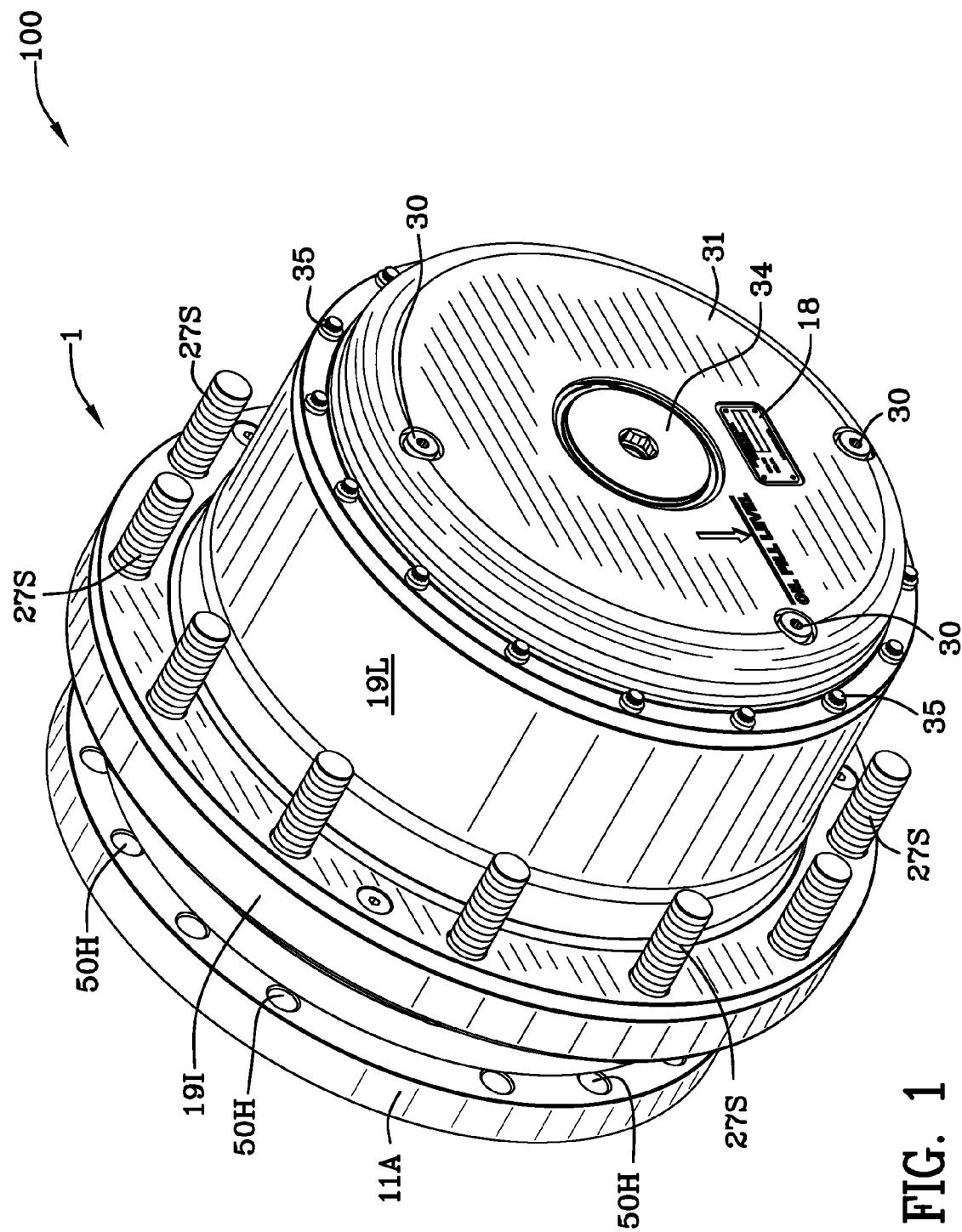
FIG. 1 is a perspective view of the planetary gearbox with integral service brake.
Figure 2:
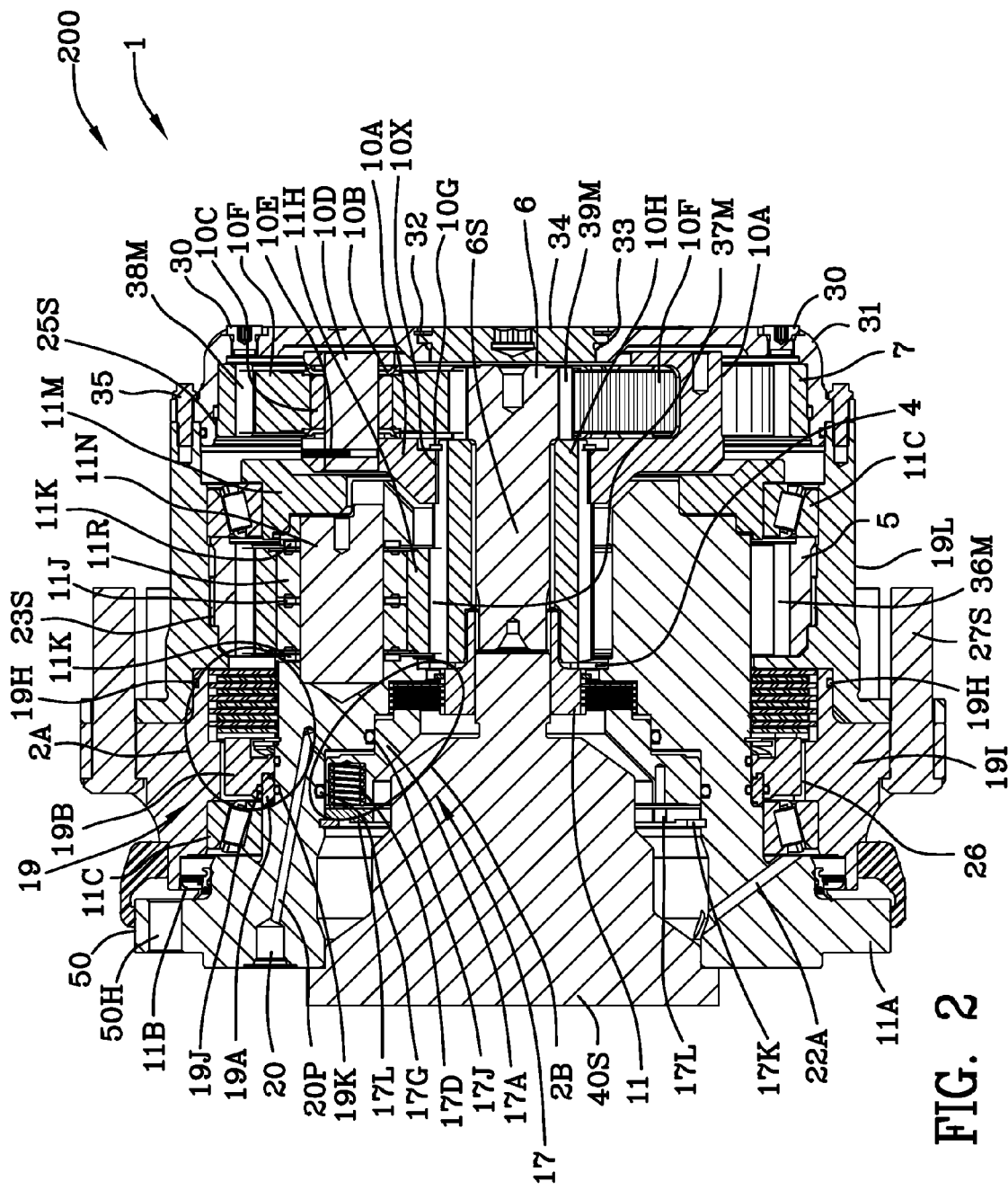
FIG. 2 is a cross-sectional view taken along the lines 2-2 of FIG. 1C illustrating the service brake and the parking brake, and a port and a passageway supplying the parking brake piston cavity operating the parking brake piston

FIG. 1 is a perspective view 100 of the planetary gearbox with integral service brake 1. Reference numeral 1 is used to denote the planetary gearbox with integral service brake. End cover 31 is illustrated on right end of the drawing. End cover 31 is affixed to and rotates with outer ring gear housing 19L. Oil fill and drain holes 30 are illustrated in the cover 31. Sometimes herein the outer ring gear housing 19L is referred to as a hub. Intermediate hub 19I is affixed to outer ring gear housing by threaded studs 27S and/or by other connectors. Bearing support 11M is illustrated in FIG. 2 and is affixed to the stationary spindle 11A. Threaded studs 27S are used to affix a wheel of a vehicle to the planetary gearbox. Holes 50H are illustrated in stationary spindle 11A which is bolted to the frame of the vehicle.

Figure 1A:
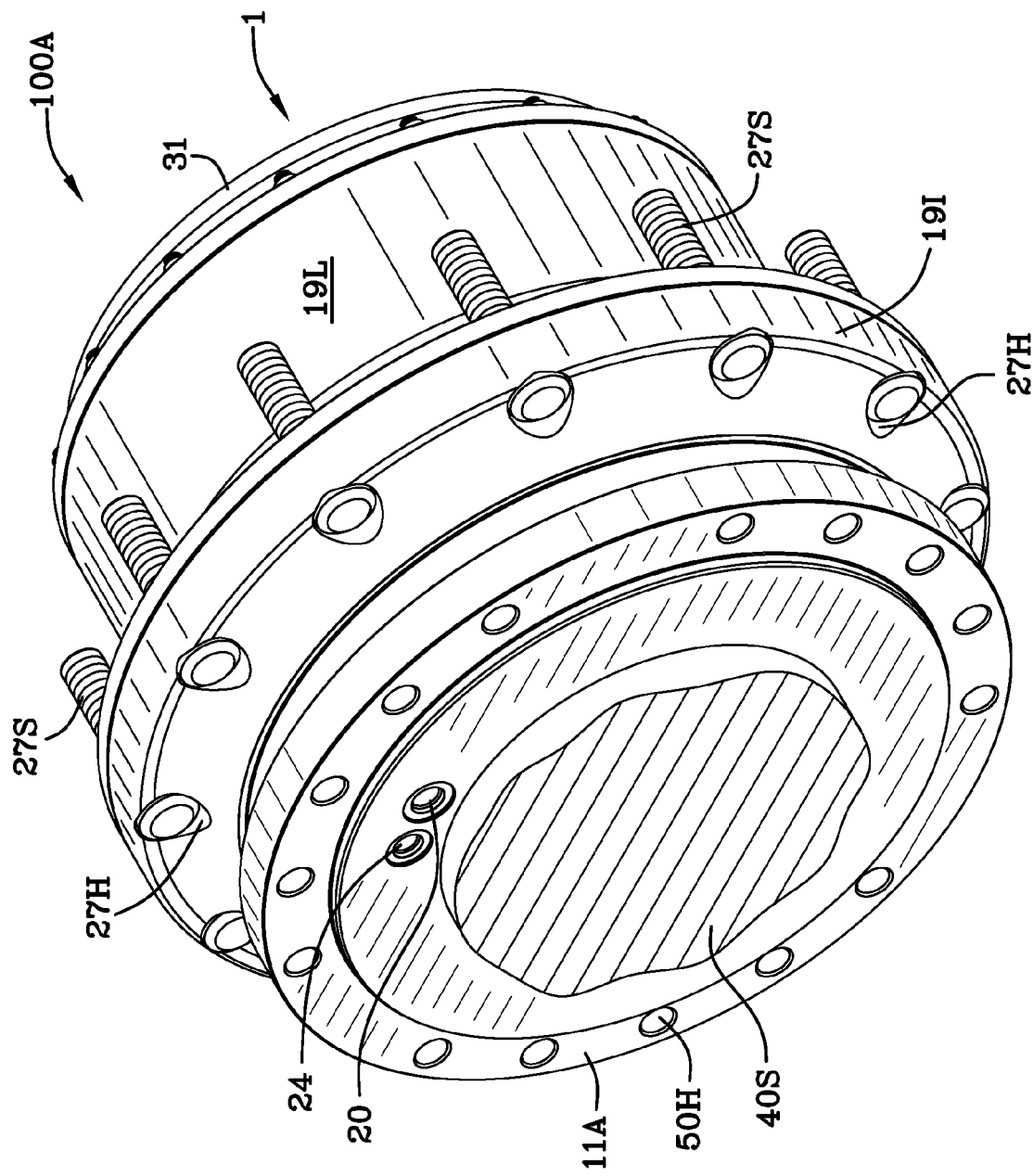
FIG. 1A is another perspective view of the planetary gearbox with integral service brake.

FIG. 1A is another perspective view 100A of the planetary gearbox with integral service brake 1. Motor shaft 40S inputs power and rotary motion into the gearbox 1. Pressure supply ports 20, 24 are illustrated in FIG. 1A. Pressure supply port 20 is connected with passageway 20P which supplies pressure to a parking brake cavity 17N. See FIGS. 2 and 2B which illustrate the parking brake in the actuated position which is the normal, safe position. Pressure is applied in passageway 20 and in parking brake cavity 17N and acts upon piston 17A releasing the parking brake and enabling operation of the wheel and, hence, the vehicle. Pressure is preferably applied using hydraulic fluid, however, air pressure or some other fluid may be used.

Still referring to FIG. 1A, pressure supply port 24 is connected with passageway 24P which supplies pressure to a service brake cavity 19N. See FIGS. 4 and 4A which illustrate the service brake 19 in the not actuated condition. In other words, the service brake 19 does not engage the service brake stack comprised of rotor discs 19C and stator discs 19D. Stator discs 19D include protrusions 53 which reside in corresponding grooves 51G which reside in the exterior of the stationary spindle 11A. Three portions of the spindle include alternating raised protrusions 51P and grooves 51G as set forth in FIG. 5. The three portions of the spindle are separated by 120°. It will be understood by those skilled in the art that the spacing and grouping of these portions may be different. In this way, the stator discs 19D are fixed against rotation with respect to the spindle 11A.

Figure 1B:
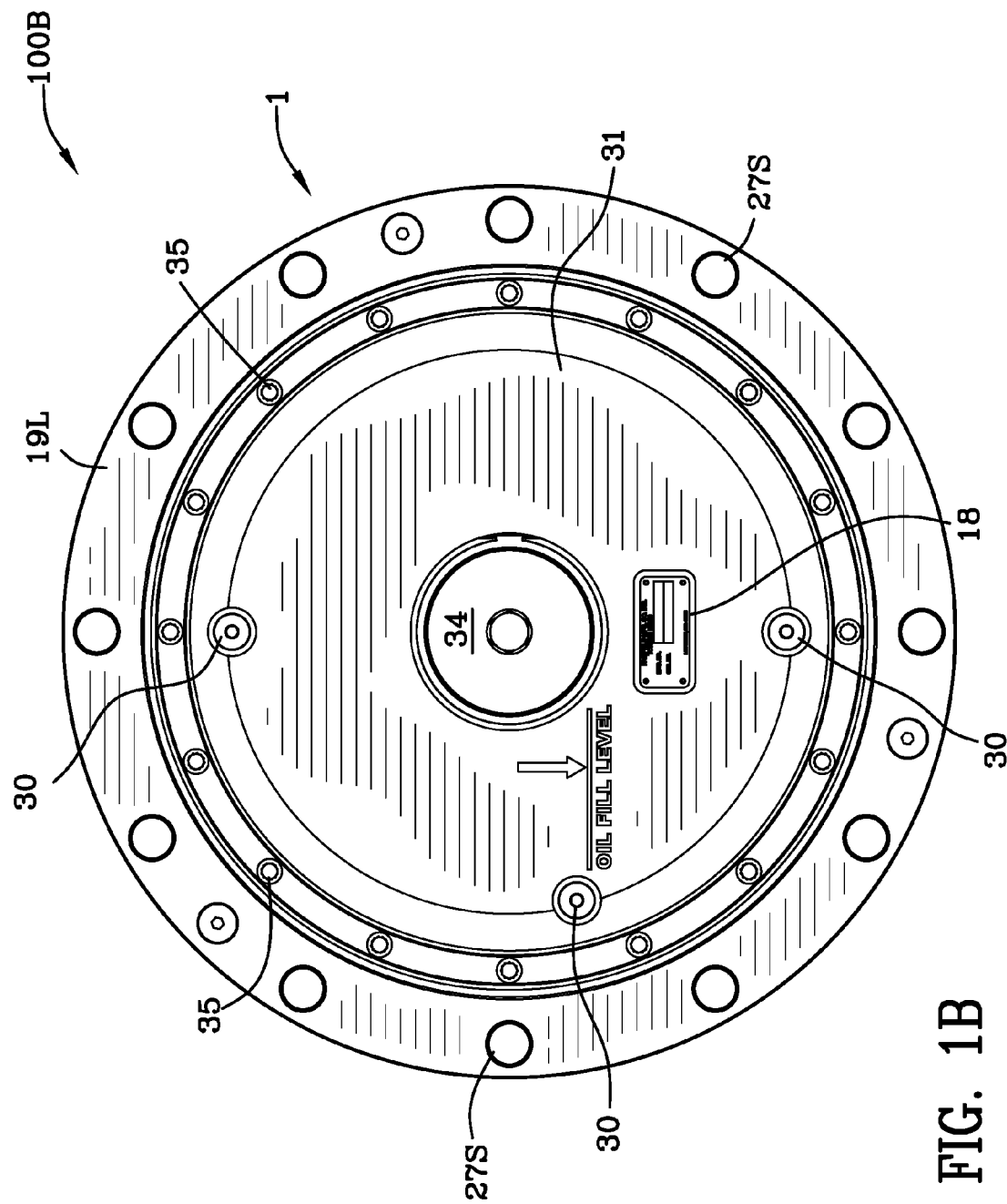
FIG. 1B is a right end view of the planetary gearbox with integral service brake.
Figure 1C:
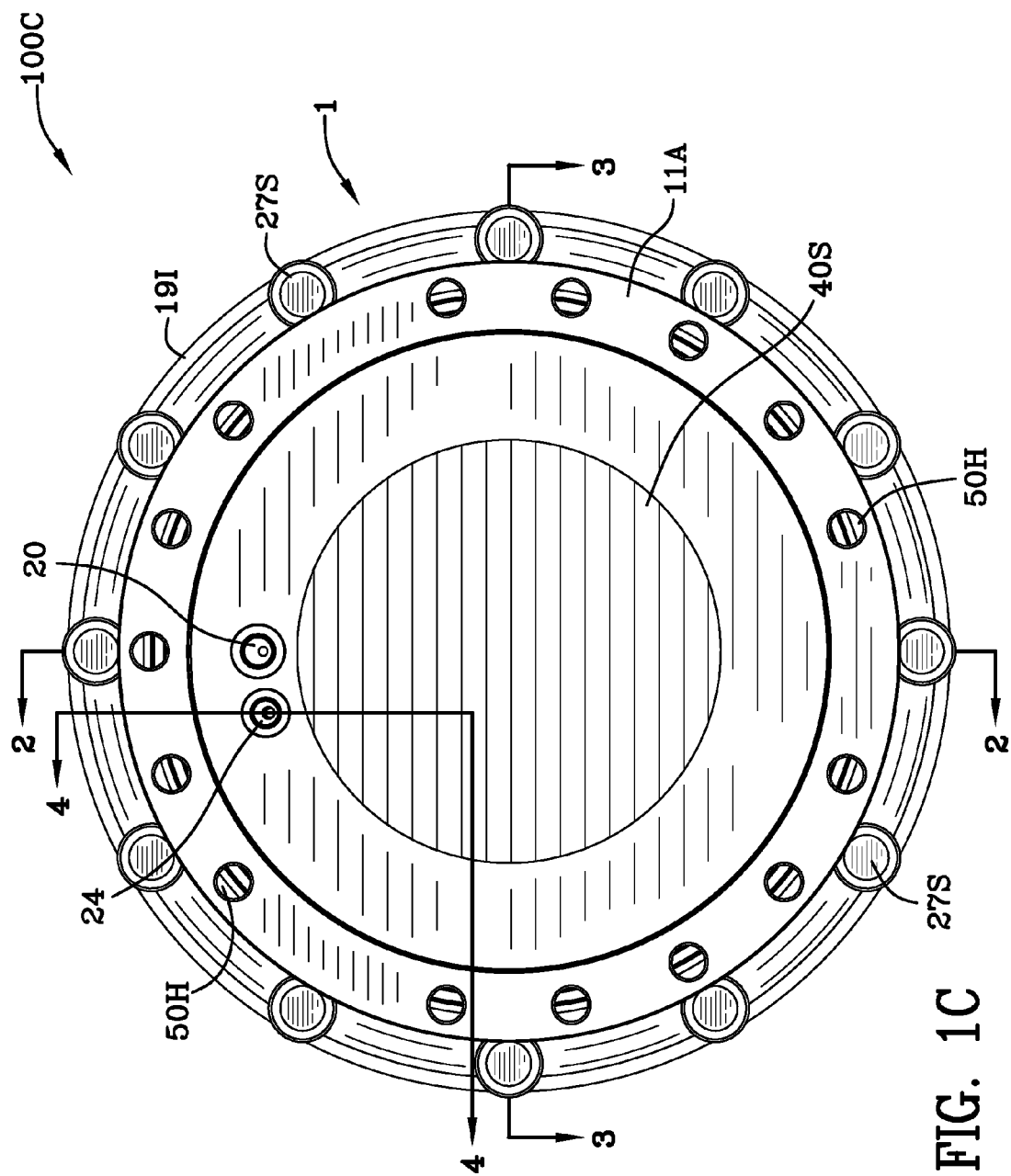
FIG. 1C is a left end view of the planetary gearbox with integral service brake.

FIG. 1B is a right end view 100B of the planetary gearbox with integral service brake 1. An oil fill level is indicated on the cover 31. FIG. 1C is a left end view 100C of the planetary gearbox with integral service brake 1.

Figure 6:
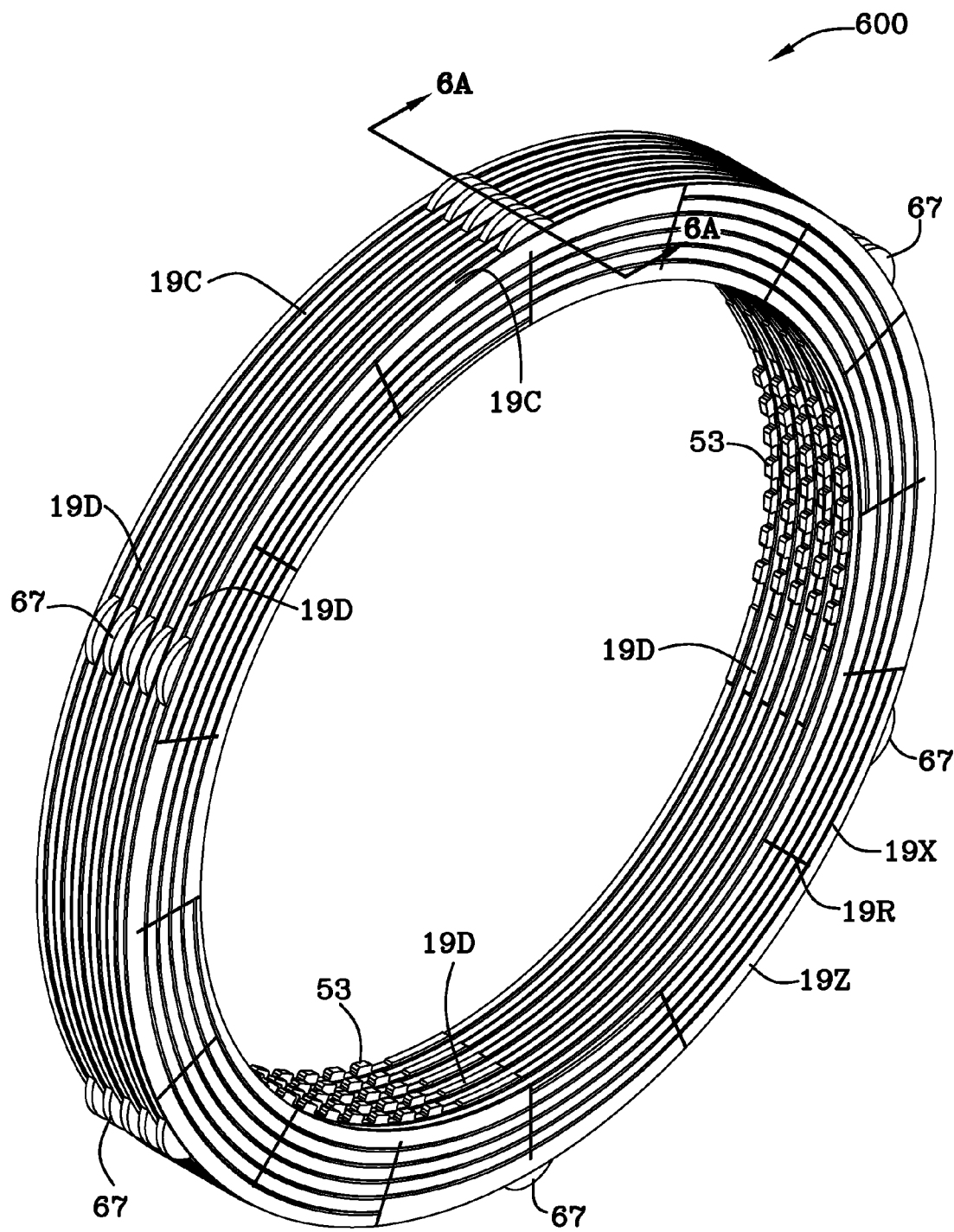
FIG. 6 is a perspective view of the stator and rotor brake discs of the service brake stack.

FIG. 6 illustrates the service brake stator discs 19D and the service brake rotor discs 19C grouped together. Stator discs 19C include inner protrusions 53 for locking the stator discs to the stationary spindle 11A. Rotor discs 19C include protrusions 67 in the shape of a portion of a semi-circle.

Figure 2A:
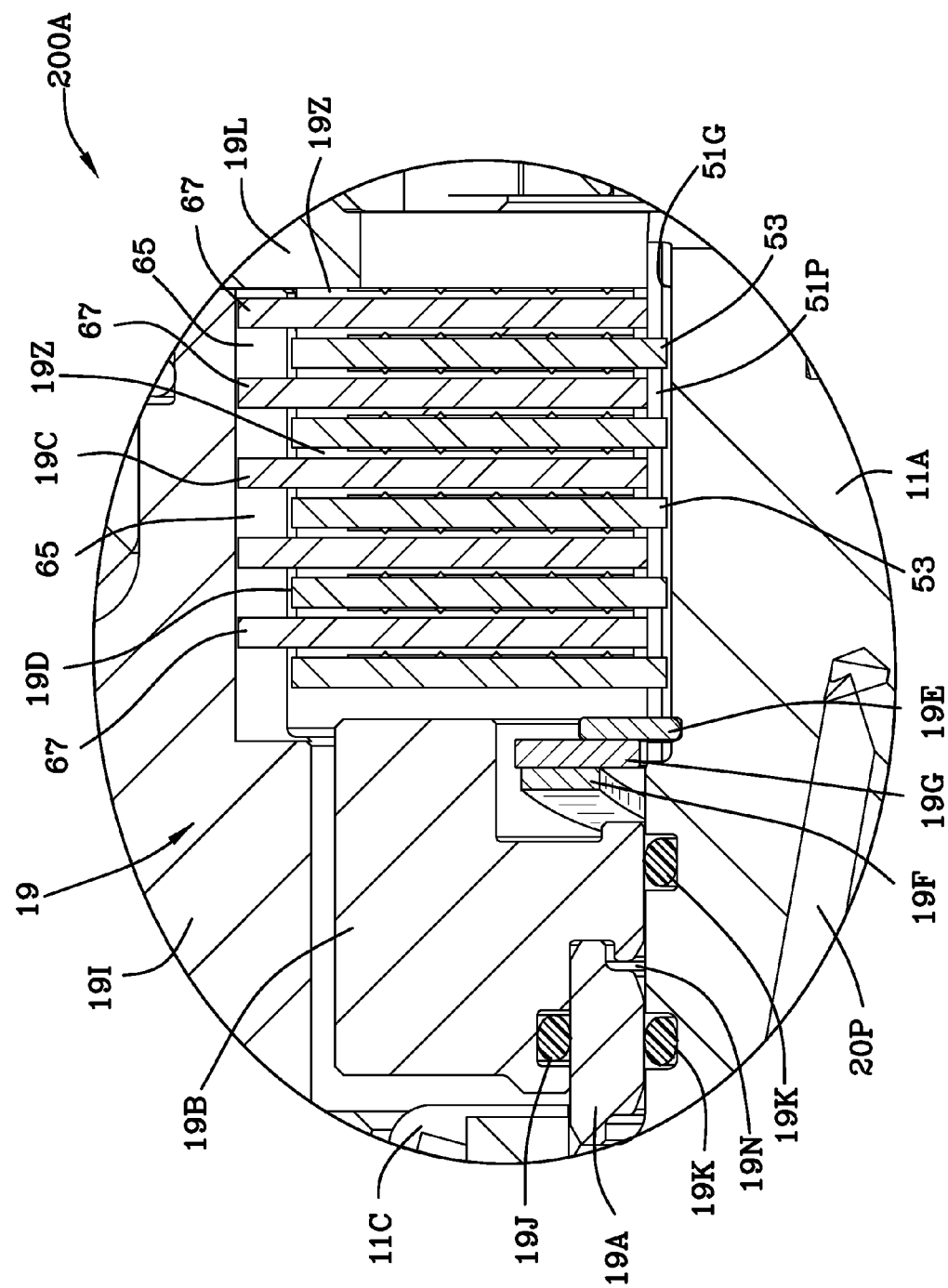
FIG. 2A is an enlargement of a portion of FIG. 2 illustrating the service brake.
Figure 2B:
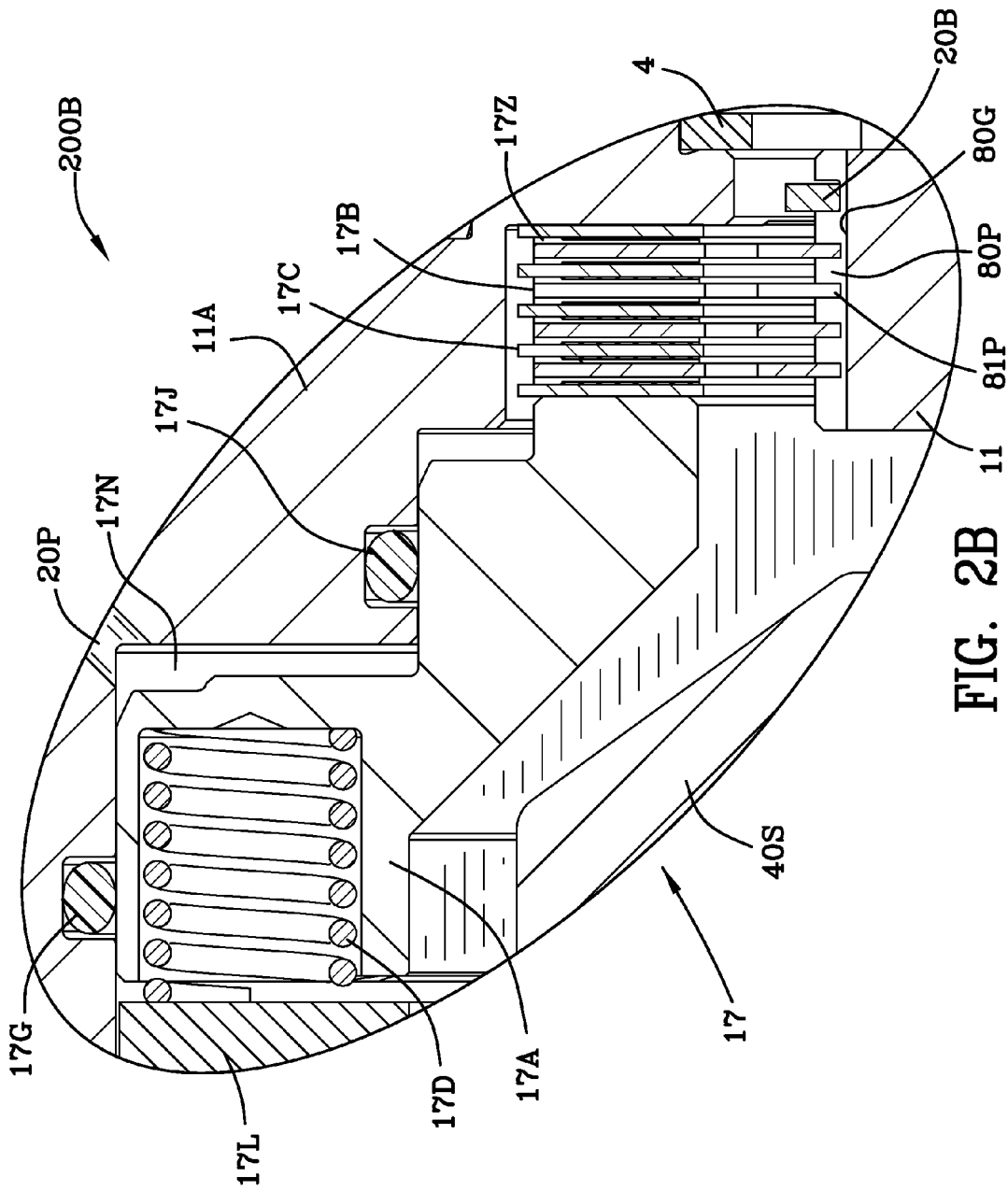
FIG. 2B is an enlargement of a portion of FIG. 2 illustrating the parking brake.
Figure 7:
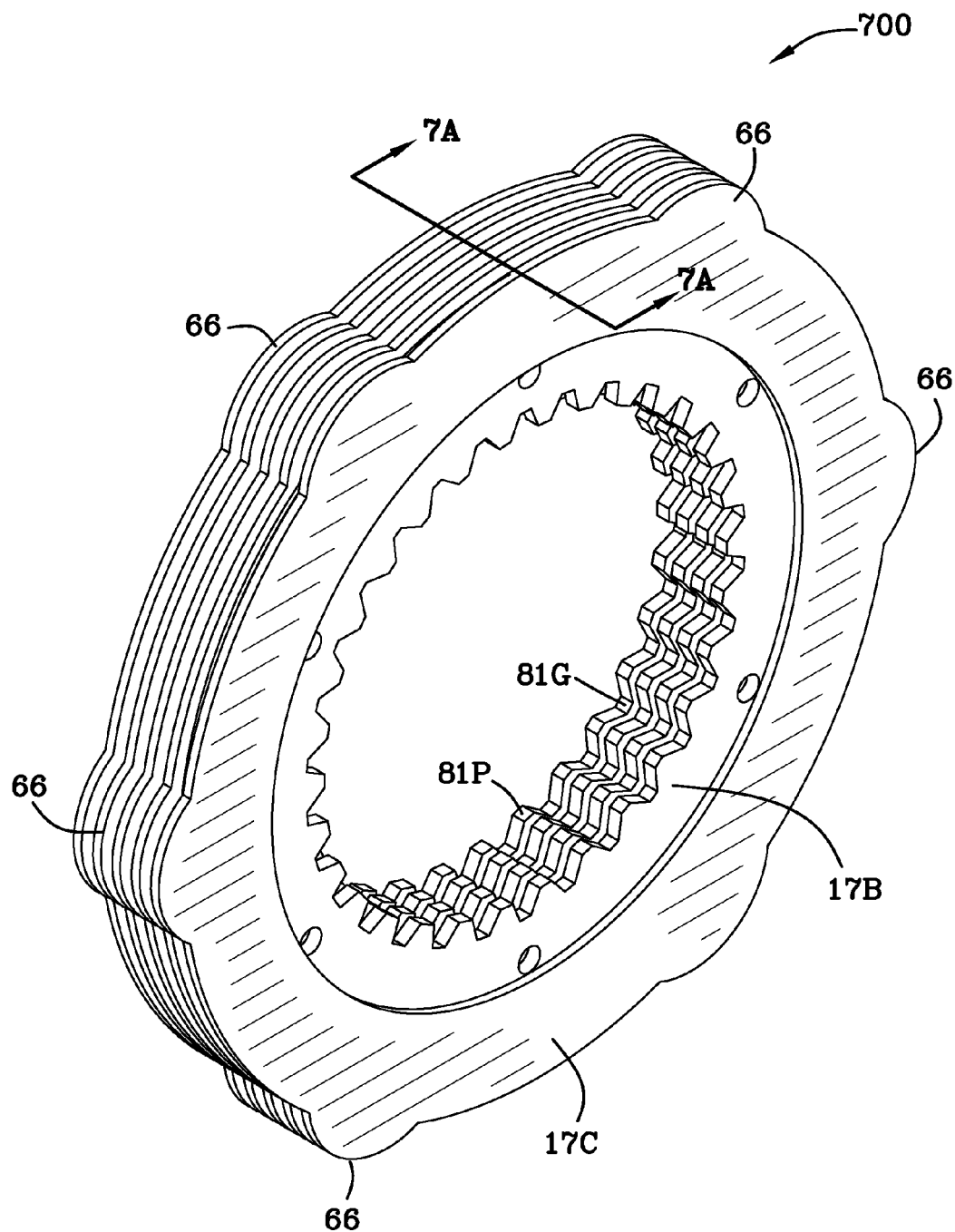
FIG. 7 is an enlarged perspective view of the parking brake disc stack.
Figure 8:
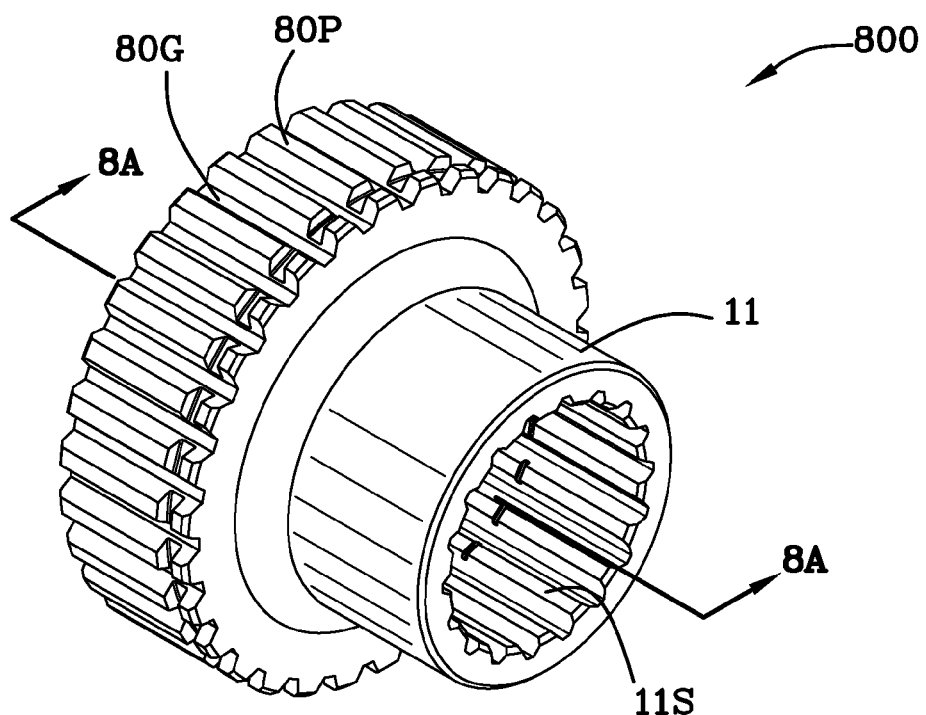
FIG. 8 is a perspective view of the coupling.

FIG. 2B is an enlargement 200B of a portion of FIG. 2 illustrating the parking brake 17. Spring 17D applies force to piston 17A which engages the parking brake stack. The parking brake stack includes a plurality of rotor discs 17B which are affixed to coupling 11. Coupling 11 is illustrated in FIG. 8 having a series of ridges or protrusions 80P to which rotor discs 17B are keyed. Rotor discs 17B include a series of recesses 81G as illustrated in FIG. 7 which interfit ridges/protrusions 80P of the coupling. In FIG. 2B, friction material 17Z is illustrated on the rotor discs 17B. The friction material is a sintered bronze type. Other friction materials may be used. The friction material 17Z can be on either the stator discs 17C or the rotor discs 17B. Still referring to FIG. 2B, spring 17D operates against plate 17L which is fixed by ring 17K. Seals 17G and 17J are preferably elastomeric seals and are located in unnumbered recesses in stationary spindle 11A. Seals 17G, 17J are adjacent parking brake cavity 17N and seal parking brake cavity 17N. Stators 17C include protrusions 66 which are keyed to recesses 55 in spindle 11A to prevent rotation of the stators 17C with respect to the spindle 11A. See FIGS. 3A, 3B, and 7 which illustrate the protrusion 66. See FIGS. 3A and 5A which illustrate recesses 55.

Figure 5:
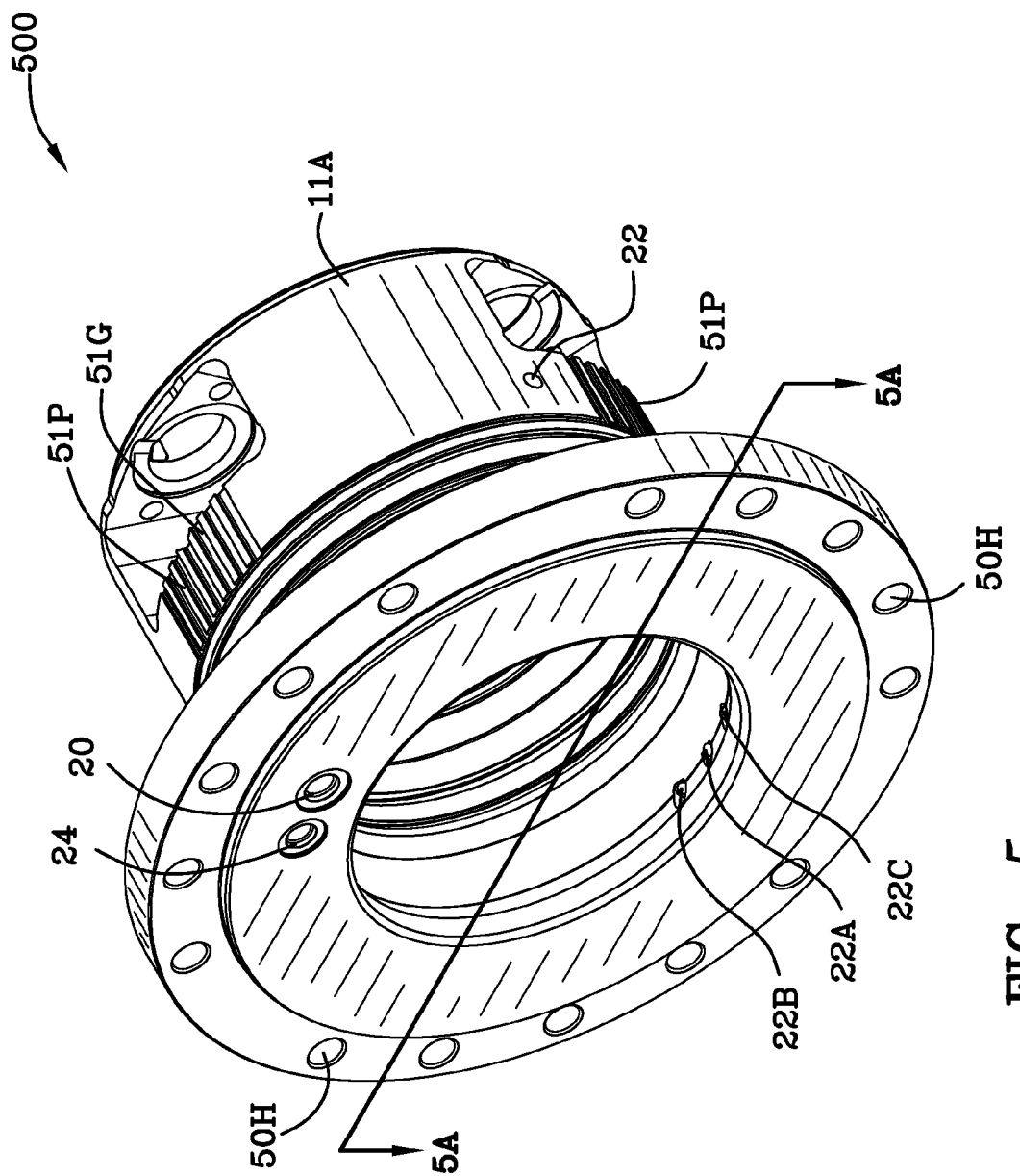
FIG. 5 is a perspective view of the spindle illustrating exterior protrusions/ridges and grooves which prevent rotation of the stator discs operating between the stationary spindle and the rotatable intermediate body/hub.
Figure 5A:
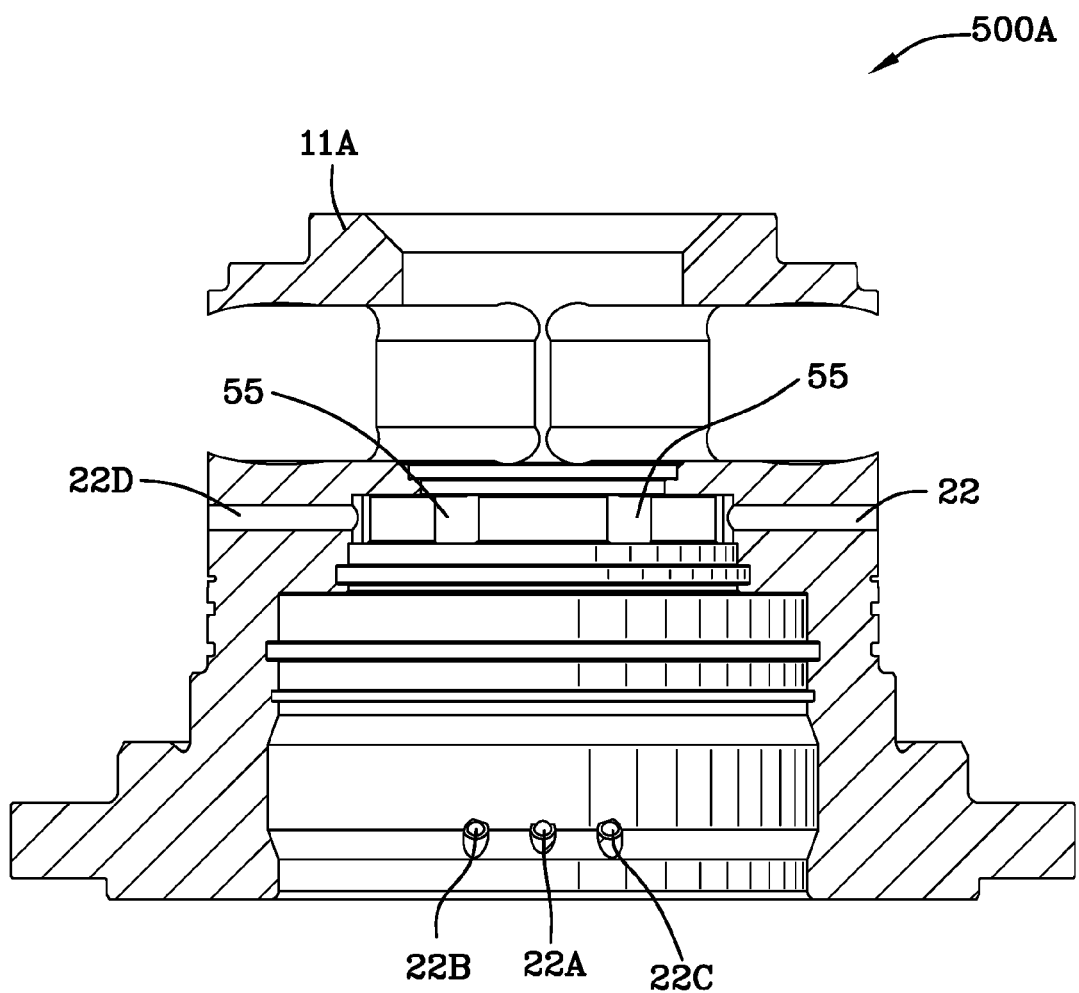
FIG. 5A is a cross-sectional view taken along the lines 5A-5A of FIG. 5 illustrating the oil return passageways in the spindle.
Figure 6A:
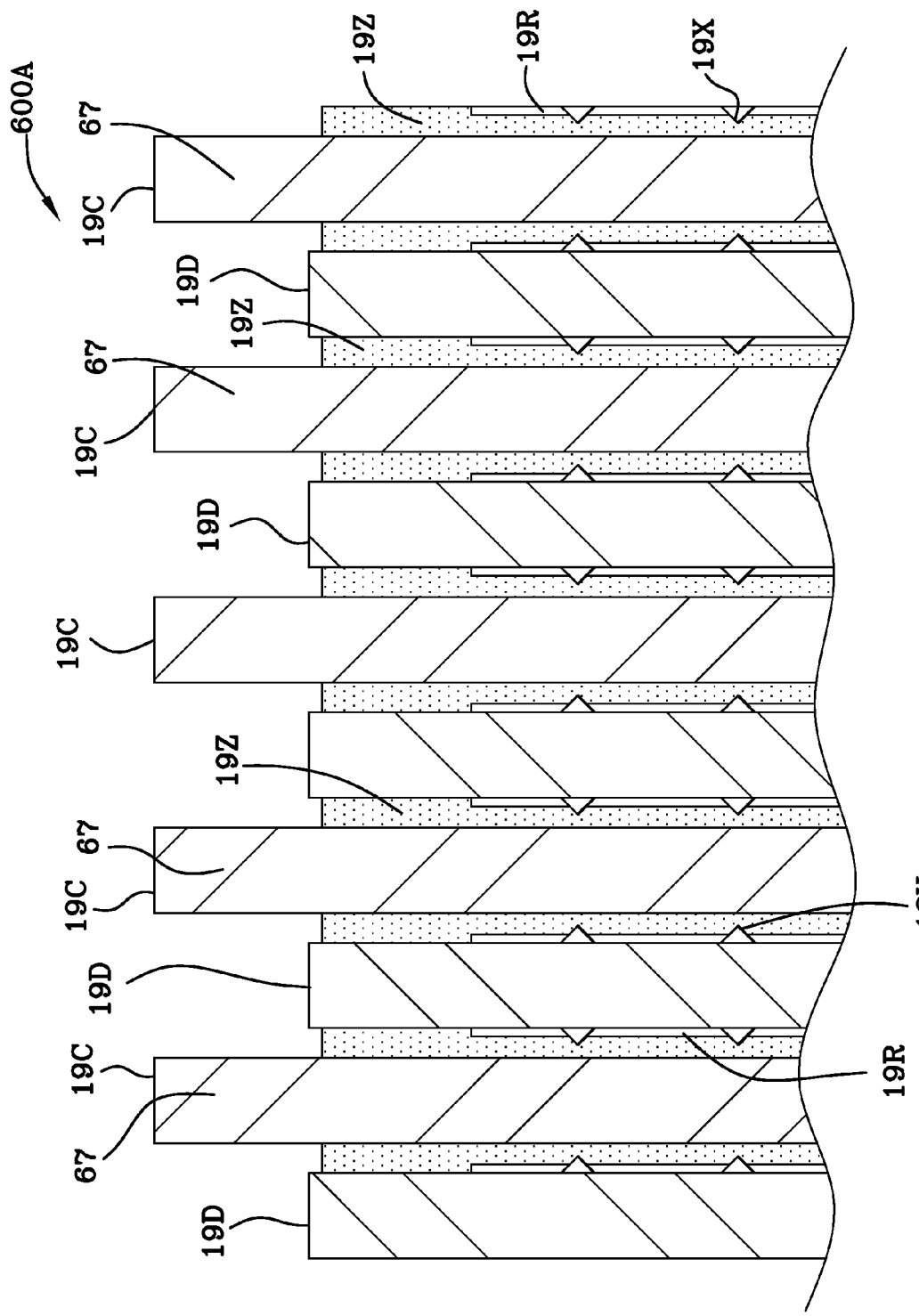
FIG. 6A is an enlarged cross-sectional view of the service brake disc stack taken along the lines 6A-6A of FIG. 6.

FIG. 6 is a perspective view 600 of the stator 19D and rotor 19C brake discs of the service brake stack. Protrusions 66 of the stators 17C of the parking brake 17 are illustrated in FIG. 7. Protrusions 66 mate with recesses 55 of the stationary spindle 11A as illustrated in FIG. 5A. FIG. 6A is an enlarged cross-sectional view 600A of the service brake stack taken along the lines 6A-6A of FIG. 6.

Figure 5B:
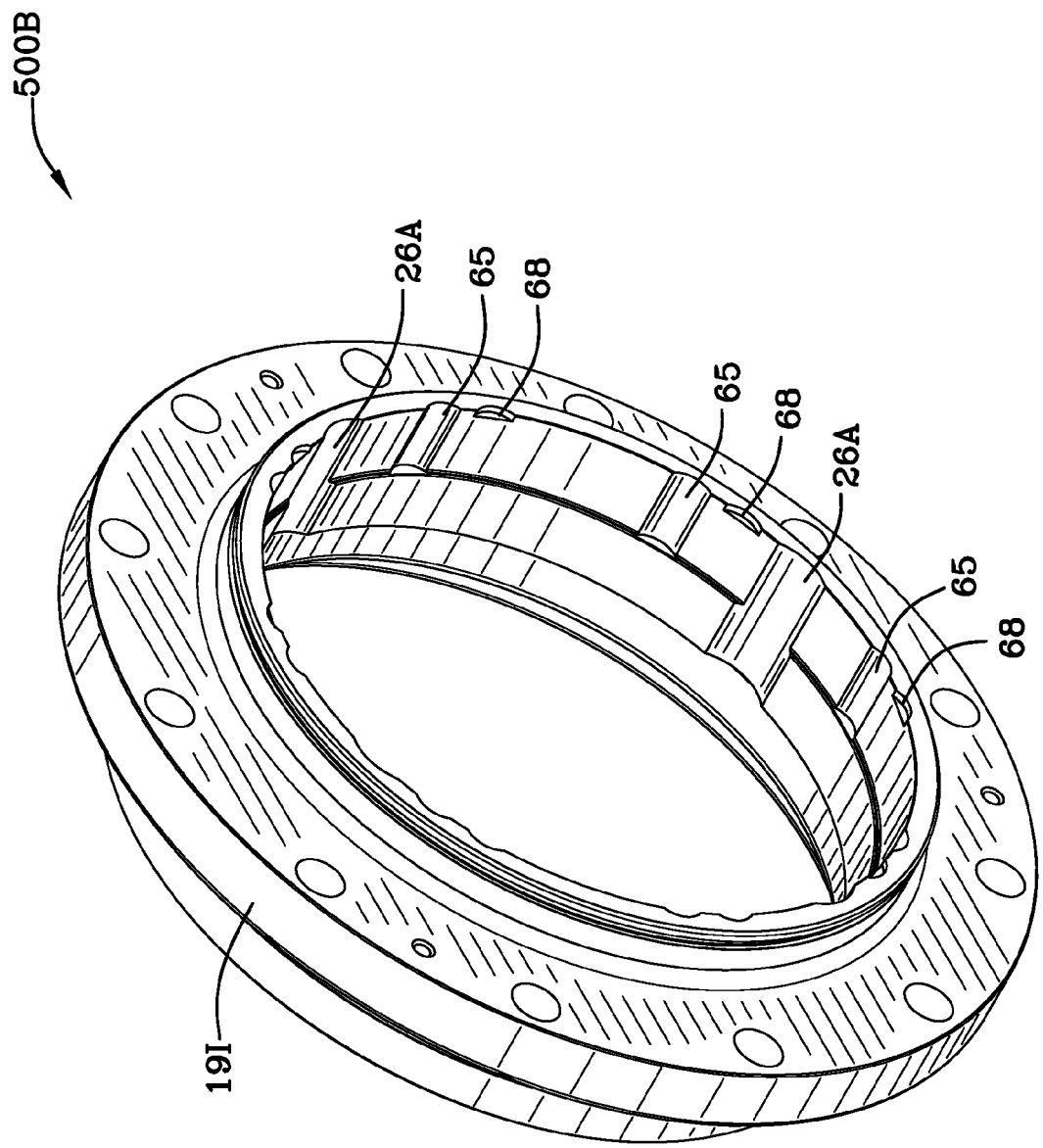
FIG. 5B is a perspective view of the intermediate hub illustrating recesses for engagement with protrusions of the stator discs of the service brake.

Referring to FIGS. 2, 5B and FIG. 6, protrusions 67 of rotor 19C engage corresponding recesses 65 in the intermediate hub 19I. FIG. 5B is a perspective view 500B of intermediate hub 19I.

Friction material 19Z is illustrated in FIGS. 2A and 6A on rotor disc 19C. The friction material is a sintered bronze type. Other friction materials may be used. FIGS. 6 and 6A illustrate generally spiral shaped slits 19X in the friction material 19Z. FIG. 6A also illustrates generally radially shaped slits 19R in the friction material 19Z. Slits 19X and 19R permit lubricating oil to flow therein enabling improved heat transfer. Spirally shaped slits 19X allow lubricating oil to flow from the inner portion of the spiral to the outer portion of the spiral. The spiral nature of the slits 19X allows lubricating oil to move more efficiently and more slowly across the side of the rotor disc thus improving heat transfer. Radial slits 19R allow lubricating oil to move radially outwardly along the slits 19R. Rotor discs 19C and stator discs 19D are illustrated in FIG. 6A as being in engagement with one another.

Portions of the brake parts, the stationary spindle, the gearing, the disconnect plug, and the coupling are made of carbon steel. Other suitable materials may be used. The housings/hubs, cover, and input carrier are made of ductile iron. Other suitable materials may be used.

Lubrication as described above in connection with slits 19X and 19R occurs when the stator discs 19D and the rotor discs 19C are separated. First and second oil passageways 22, 22D in the stationary spindle are located horizontally with respect to the earth just above the oil fill level. However, additional oil passageways could be located within the stationary spindle 11A and be oriented differently with respect to the earth. Referring to FIG. 2B, when the parking brake 17 is not active, the parking brake stator discs 17C and rotor discs 17B are separated each from the other. As the rotor discs 17B rotate with the coupling 11, they pick-up oil and move the oil into first and second oil passageways 22, 22D in the stationary spindle 11A.

FIG. 2 is a cross-sectional view 200 taken along the lines 2-2 of FIG. 1C illustrating the service brake 19 and the parking brake 17, and port 20 and passageway 20P supplying pressure to the parking brake piston cavity 17N operating the parking brake piston 17A. See FIG. 2B which shows the parking brake in detail. FIG. 2A is an enlargement 200A of a portion of FIG. 2 illustrating the service brake 19. In FIGS. 2 and 2A, the service brake is not actuated, in other words, no pressure has been applied to the service brake piston cavity 19N. The service brake piston cavity 19N is best illustrated in FIG. 4A. FIG. 5B is a perspective view 500B of the intermediate hub 19I illustrating recesses 65 for engagement with protrusions 67 of the rotor discs 19C of the service brake 19.

FIG. 2 includes an illustration of the planetary gear system which includes an input stage and an output stage. The input stage is illustrated and includes the input shaft 6S, sun gear 6, input planet gears 10F, input ring gear 7, and input carrier 10A. Input carrier 10A drives the output stage of the planetary gear system. Input carrier 10A drives the second/output sun gear 10H which drives the output planet gears 11H which mesh with output ring gear housing/hub 19L.

Figure 4:
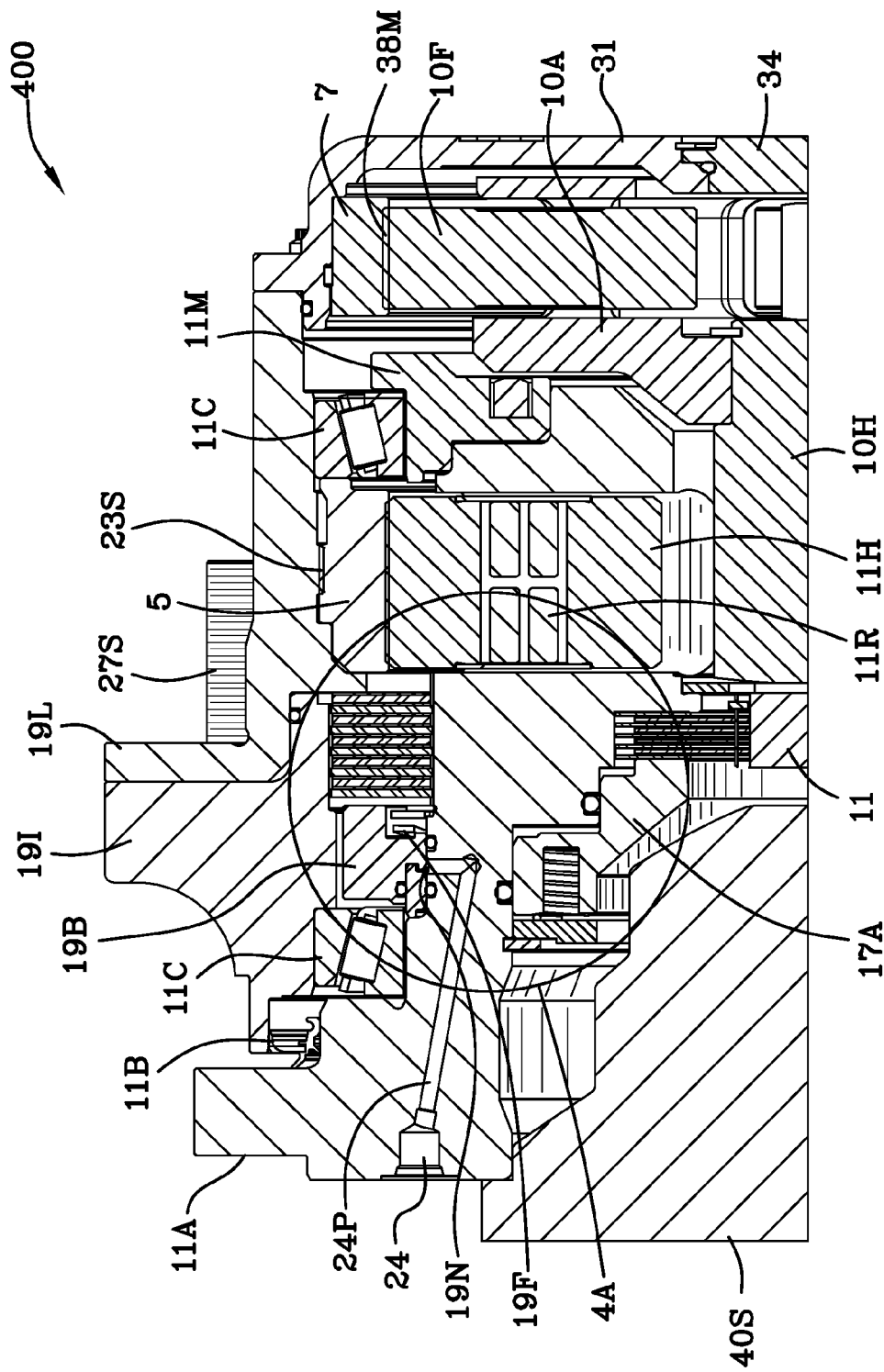
FIG. 4 is a cross-sectional view of the planetary gearbox with integral service brake taken along the lines 4-4 of FIG. 1C illustrating, inter alia, a port and a passageway supplying pressure to the service brake piston cavity for operating the service brake piston; in this view, pressure is not being applied to the piston cavity.
Figure 4A:
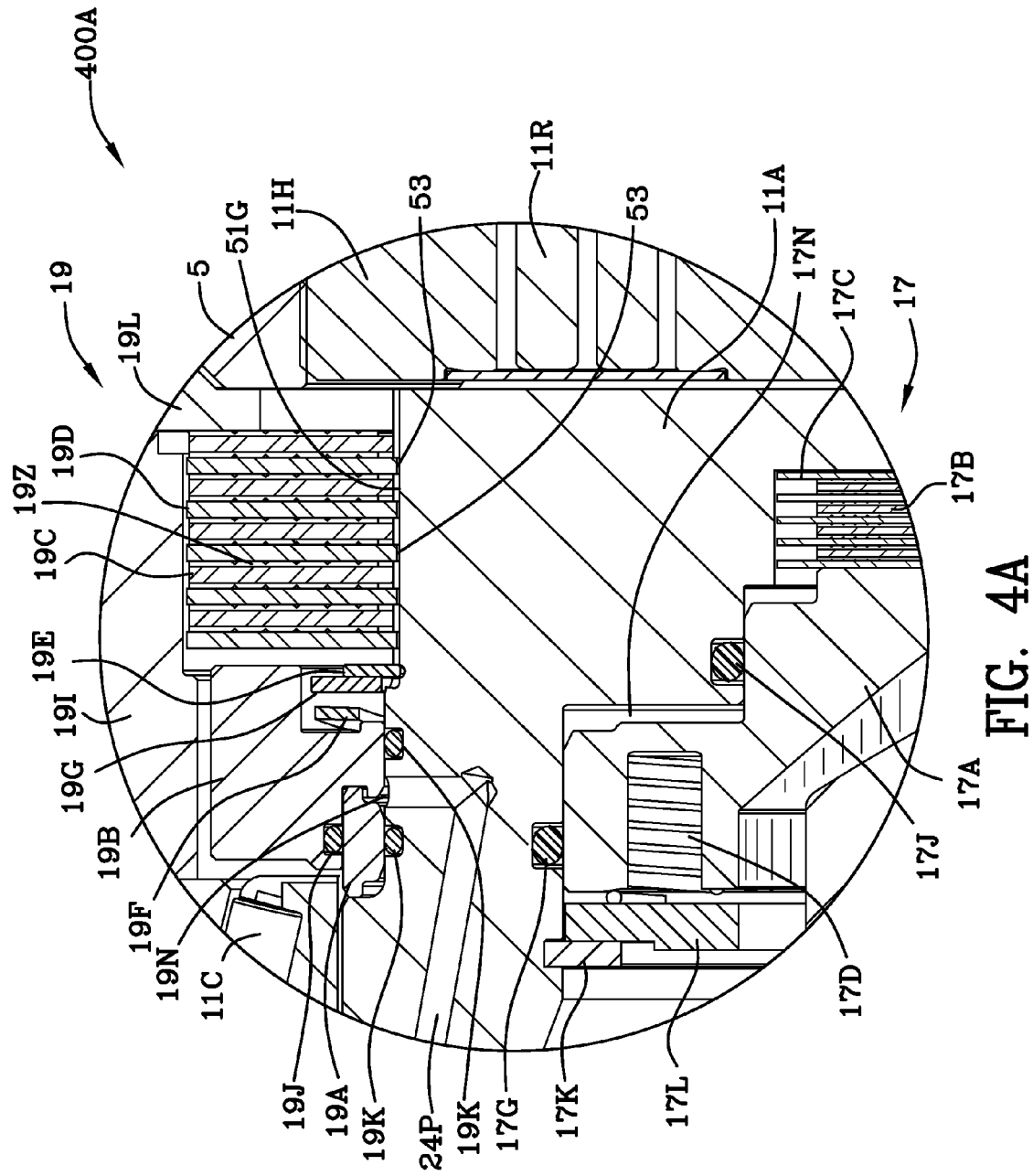
FIG. 4A is an enlargement of a portion of FIG. 4 illustrating the service brake, the service brake piston, the parking brake, and the parking brake piston.

FIG. 4 is a cross-sectional view 400 of the planetary gearbox with integral service brake 1 taken along the lines 4-4 of FIG. 1C illustrating, inter alia, port 24 and a passageway 24P supplying the service brake piston cavity 19N operating the service brake piston 19B.

FIG. 4A is an enlargement 400A of a portion of FIG. 4 illustrating the service brake 19, the service brake piston 19B, the parking brake 17, and the parking brake piston 17A. FIGS. 4 and 4A illustrate the service brake 19 in the normal state which is the "off" condition, or the non-actuated position, or put another way, the disengaged position. Put another way, the rotor discs 19C and the stator discs 19D are illustrated in FIG. 4A and they are not in engagement with each other. Spring 19F is a wave spring and it encircles the stationary spindle 11A. Spring 19F urges service brake piston 19B away from the service brake disc stack. By service brake disc stack it is meant the rotors 19C and the stators 19D. O-ring seals 19J, 19K seal the sealing ring 19A. O-rings 19K, 19K seal the opening leading to the service brake piston cavity 19N as best viewed in FIG. 4A.

Still referring to FIG. 4A, protrusions 53 of stator discs 19D are shown and these protrusions reside in one of the grooves 51G of the stationary spindle 11A. Service brake piston cavity 19N is formed between sealing ring 19A, service brake piston 19B and the stationary spindle 11A. Retaining ring 19E retains thrust washer 19G and wave return spring 19F. The service brake 19 normally operates in the disengaged state except when the operator of the vehicle wants to slow or stop the vehicle. In the position illustrated in FIGS. 4 and 4A, the vehicle is parked as the parking brake 17 is engaged and the service brake piston is shown engaging the brake stack.

Figure 4B:
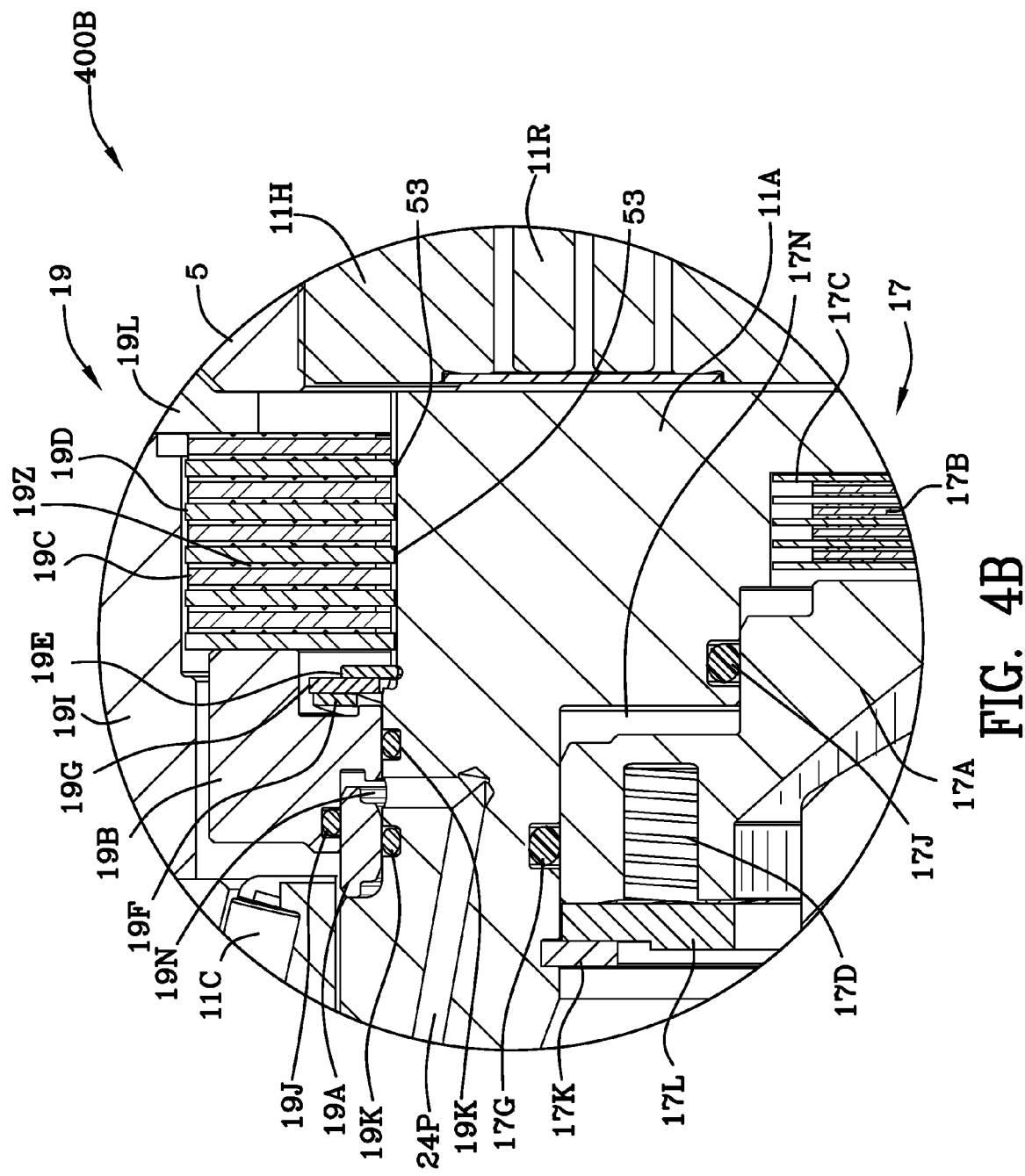
FIG. 4B is an enlarged view similar to the enlargement of FIG. 4A illustrating the parking brake not actuated and the service brake actuated.

FIGS. 4 and 4A also illustrate the intermediate hub 19I affixed to the rotatable ring gear housing/hub 19L. FIG. 4B is an enlarged view 400B similar to the enlargement of FIG. 4A illustrating the parking brake 17 not actuated and the service brake 19 actuated with pressure being applied to the service brake piston cavity 19N. In the condition illustrated in FIG. 4B, the vehicle is stopped or slowing and the parking brake has been released and is not activated or engaged and pressure has been applied to parking brake piston cavity 17N.

FIG. 5 is a perspective view 500 of the spindle 11A illustrating exterior ridges or protrusions 51P and grooves 51G between the protrusions. The protrusions 51P and grooves 51G prevent rotation of the stator discs 19D operating between the stationary spindle 11A and the rotatable intermediate hub 19I. Reference is made to FIG. 6 illustrating protrusions 53 of the stator discs 19D of the service brake 19.

Referring again to FIG. 5, one of the oil passageways 22 in the stationary spindle 11A is illustrated. The unnumbered openings in the right portion of the spindle illustrated in FIG. 5 accommodate the output planet gears 11H which are mounted therein. FIG. 5A is a cross-sectional view 500A taken along the lines 5A-5A of FIG. 5 illustrating the oil return passageways 22A, 22B, and 22C in the spindle 11A. FIG. 5B is a perspective view 500B of the intermediate hub 19I illustrating recesses 65 for engagement with protrusions 67 of the rotor discs 19C of the service brake 19.

As stated above, FIG. 2 is a cross-sectional view 200 taken along the lines 2-2 of FIG. 1C illustrating the service brake 19 and the parking brake 17, and port 20 and a passageway 20P for supplying pressure to the parking brake piston cavity 17N operating the parking brake piston 17A. In FIG. 2 there is not pressure in cavity 17N. See FIG. 2B for an enlarged view. FIG. 2 illustrates the motor drive shaft 40S which is supported by bearings or some other support system not illustrated herein. Motor shaft 40S is splined to coupling 11. FIG. 8 illustrates coupling 11, internal spline 11S, and exterior protrusions 80P and exterior grooves 80G. The exterior protrusions 80P and grooves 80G are in a mating arrangement with the rotor discs 17B of the parking brake 17. Parking brake 17 is illustrated best in FIGS. 2B and 3A.

Spindle 11A includes flange 50 and bolt holes 50H in the flange for securing the spindle to the frame of the vehicle. Seal 11B resides intermediate spindle 11A and intermediate hub 19I and prevents dust and debris from entering bearing 11C and other components. Intermediate hub 19I is illustrated in FIG. 5B and illustrates recesses 65 which receive correspondingly shaped protrusions 67 of the rotor discs of the service brake 19 which interfit the recesses 65. In this way, rotors 19C rotate with hubs 19I, 19L.

Studs 27S affix intermediate hub 19I to output ring gear housing 19L. Additionally, studs 27S interconnect the wheel of the vehicle to the intermediate hub 19I and to the output ring gear housing 19L. Service brake piston 19B is viewed in FIG. 2 and is best viewed in FIG. 2A. Output ring gear 5 is splined 23S to output ring gear housing 19L.

Output planet gears 11H are supported by output planet shaft 11N which is mounted in the stationary spindle 11A. Bearing carrier/support 11M is affixed to the stationary spindle 11A with bolts (not shown) and secures the rotatable components of the planetary gearbox and integral service brake to the stationary spindle enabling them to rotate therearound.

Still referring to FIG. 2, output planet thrust washers 11J, 11K secure the output planet gear 11H for controlled rotation about output stage needle bearings 11R and output planet shaft 1N. Bolts 35 secure the cover 31 to the output gear housing 19L.

FIG. 2 illustrates the input shaft 6S splined to coupling 11. Input planet gears 10F are mounted about input planet shaft 10D on needle bearing 10C. Input planet shaft 10D is mounted to input planet carrier 10A and the input planet gears 10F rotate therearound. Input shaft 6S includes a first sun gear 6 in meshing engagement 39M with input planet gears 10F. Input planet gears 10F are in meshing engagement with input ring gear 7 and react thereto driving carrier 10A. In the example of FIG. 2, there are three input planet gears. Input ring gear 7 is splined 25S to cover 31. FIG. 2 also illustrates cover 31 and several oil fill or drain plugs therein 30. Retaining ring 32 secures the disconnect plug 34 and O-ring 33.

Still referring to FIG. 2, roll pin 10E secures the input planet shaft 10D to the input planet carrier 10A. Retaining ring 10G secures the input planet carrier 10A to the output sun gear 10H. Input planet carrier 10A is splined 10X to output sun gear 10H and the output sun gear rotates therewith. Thrust washers 10B secure the needle bearings 10C to shaft 10D.

Output sun gear 10H is in meshing engagement 37M with output planet gears 11H. Output planet gears do not orbit within the gearbox, rather, they are mounted on output planet shafts 11N and corresponding needle bearings 11R. In the example of FIG. 2, there are three output planet gears 11H. Output planet gears 11H mesh with the output ring gear 5 which is splined 23S to the output housing. Output planet gears 11H drive output ring gear housing/hub 19L and intermediate hub 19I.

FIG. 7 is an enlarged perspective view 700 of the parking brake stack 17. Protrusions 66 which mate with recesses 55 in the stationary spindle 11A are illustrated in FIG. 7. FIG. 7 further illustrates protrusions 81P and grooves 81G which interfit with grooves 80G and protrusions 80P, respectively.

Figure 7A:
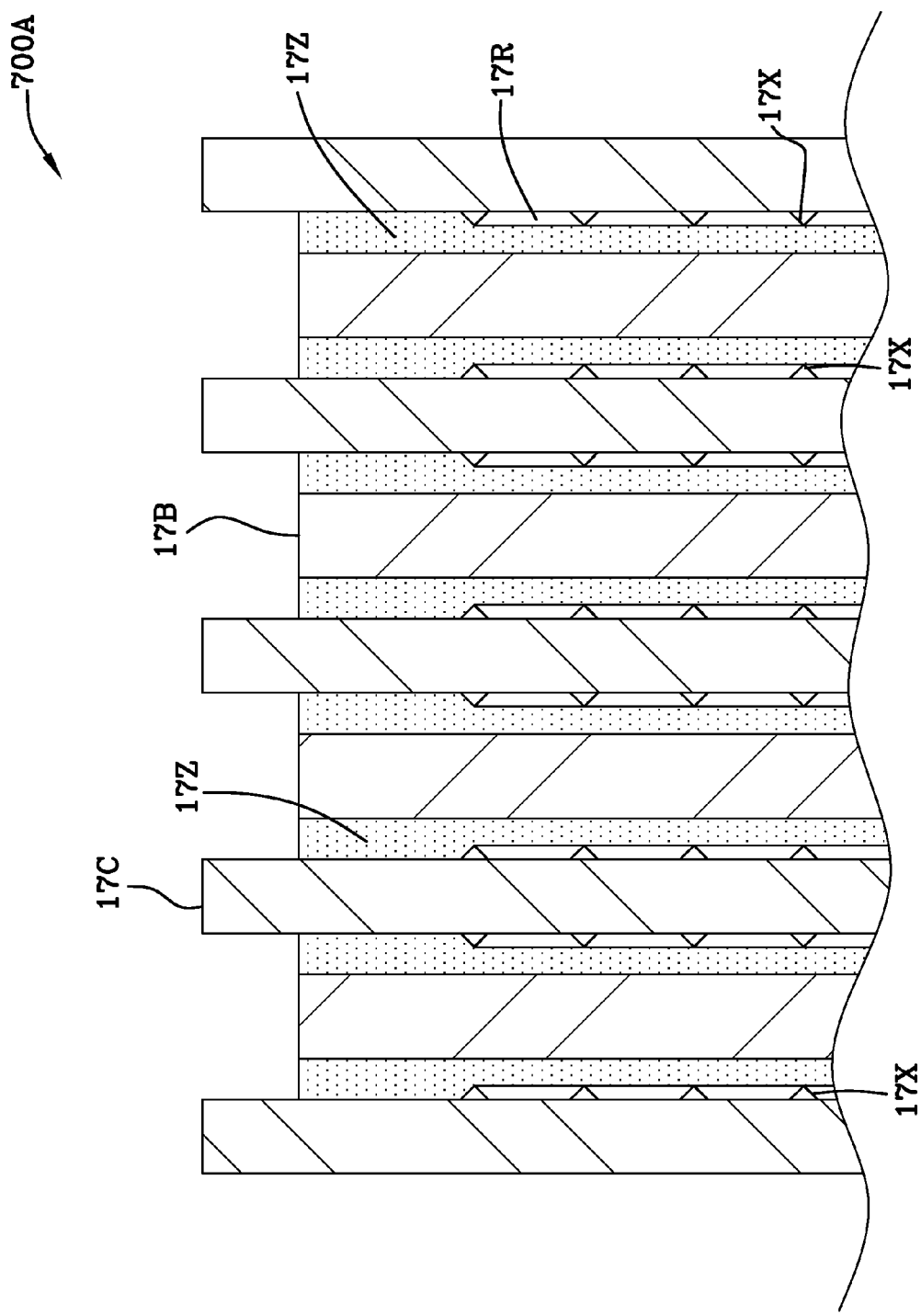
FIG. 7A is an enlarged cross-sectional view of the service brake disc stack taken along the lines 7A-7A of FIG. 7.

FIG. 7A is an enlarged cross-sectional view 700A of the service brake stack taken along the lines 7A-7A of FIG. 7. Stator discs 17C and rotor discs 17B are illustrated in FIG. 7A along with the friction material 17Z on the rotor discs 17B. The friction material 17Z can be on either the stator discs 17C or on the rotor discs 17B. Spiral shaped slits 17X are included in the rotor discs 17B. Radial slits 17R are also in the rotor disc 17B.

Figure 8A:
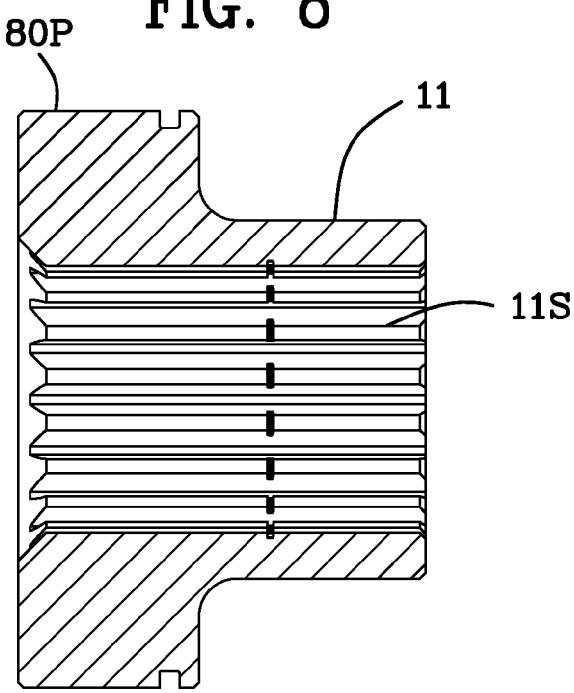
FIG. 8A is a cross-sectional view taken along the lines 8A-8A of FIG. 8 illustrating grooves and protrusions in the exterior thereof.

FIG. 8 is a perspective view 800 of the coupling 11. FIG. 8 illustrates an internal spline 11S to which input shaft 6S is connected and to which motor shaft 40S is connected. FIG. 8A is a cross-sectional view taken along the lines 8A-8A of FIG. 8 illustrating grooves 80G and protrusions 80P in the exterior thereof.

Figure 9:
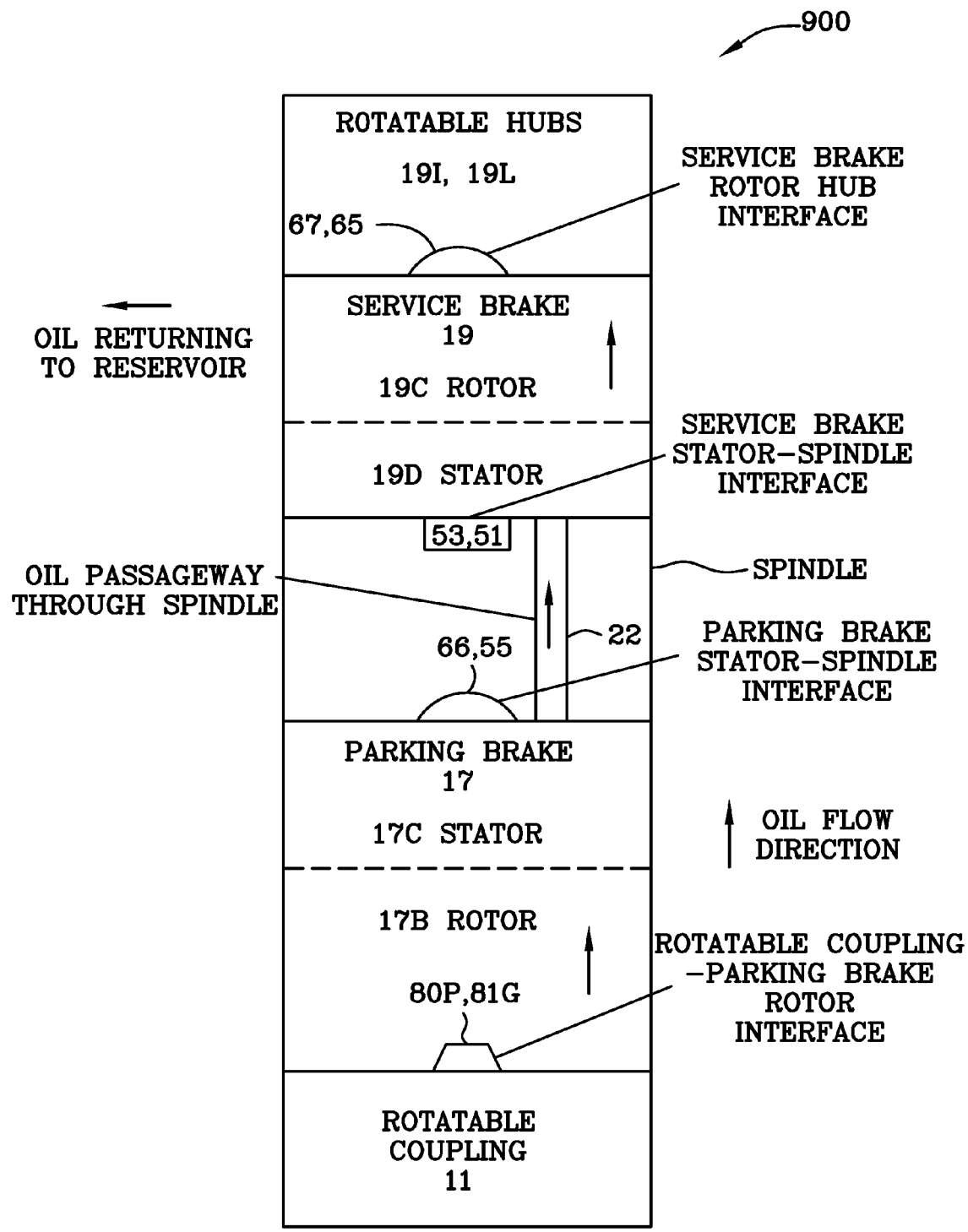
FIG. 9 is a diagrammatic view of the parking brake and the service brake together with the stationary spindle, the rotatable coupling and the rotatable hubs.

FIG. 9 is a diagrammatic view 900 of the parking brake 17 and the service brake 19 together with the stationary spindle 11A, the rotatable coupling 11 and the rotatable hubs 19I, 19L. This diagrammatic view is taken in consideration of the condition illustrated in FIG. 3B where both the service brake 19 and the parking brake 17 are not actuated and their respective disc stacks are not engaged. In the illustration of FIGS. 3B and 9, oil flow outwardly is represented by the unnumbered arrows in FIG. 9. Rotatable coupling 11 includes ridges or protrusions 80P and grooves 80G as shown in FIG. 8. Protrusions 80P interfit corresponding grooves 81G of the rotor discs 17B of the parking brake 17 as shown in FIG. 7. Protrusions 81P of the rotor discs of the parking brake interfit grooves 80G of the coupling 11. Parking brake stator discs 17C include protrusions 66 which interfit recesses 55 in the stationary spindle 11A as shown in FIGS. 5A and 7. Service brake stator discs 19D include protrusions 53 which interfit grooves 51G of the stationary spindle 11A as shown in FIGS. 5 and 6. Passageways 22, 22D transport oil through the stationary spindle 11A. Service brake rotor discs 19C include protrusions 67 which interfit grooves 65 in rotatable hub 19I as shown in FIGS. 5B and 6. Oil exits along a passageway at the interface between the service brake 19 and the rotatable hub 19I to bearing 11C where it is pumped by the bearing to an oil return passageway into the oil reservoir as shown in FIG. 2. The oil reservoir extends from the bottom of the gearbox to approximately the oil fill line.

A double planetary gearbox with an output rotatable ring gear housing/hub 19L is disclosed in the various drawing views. This type of gearbox operates by taking a rotational input from the motor shaft 40S. The shaft 40S is driven by a motor (not shown) and is coupled to the coupling 11. The coupling 11 is coupled to the input shaft 6S. The input shaft 6S includes a sun gear 6. The motion of the sun gear 6 is transmitted through an input planetary stage having input planet gears 10F and an output planetary stage having output planet gears 11H. These planetary stages transmit motion to the ring gears 5, 7 which are rigidly connected to the intermediate hub 19I and the housing 19L. The intermediate hub 19I and the housing 19L are affixed together.

The vehicle's wheel is attached to the intermediate hub 19I and the ring gear housing 19L. When transmitting power through the first and second planetary stages, the output speed is reduced and the output torque is increased by the same ratio.

The service brake is housed between the spindle 11A which is connected to the frame of the vehicle and the intermediate hub 19I. The wheel of the vehicle is connected to the intermediate hub 19I by threaded studs 27S and nuts. One of the main wheel bearings 11C is mounted on the outer part of the spindle 11A and supports the intermediate hub 19I. Another main wheel bearing 11C is mounted between bearing support 11M and output ring gear housing 19L. Output ring gear housing 19L is bolted to intermediate hub 19I. Both bearings 11C, 11C support the intermediate hub 19L and ring gear output housing 19L. Since the wheel of the vehicle is rigidly attached to the intermediate hub 19I by the studs 27S and nuts, the main wheel bearings 11C, 11C support any loading imparted to wheel of the vehicle.

The service brake includes: a plurality of stators 19D; a plurality of rotors 19C; a service piston 19B; a service piston return spring 19F; and, a sealing ring 19A.

The parking brake includes: a plurality of stators 17C; a plurality of rotors 17B; a parking piston 17A; and, a plurality of piston application springs 17D.

Springs 17D apply force to the parking piston 17A which in turn applies a force to a stack of alternating rotors 17B and stators 17C. The stators 17C are coupled to the spindle 11A and the rotors 17B are coupled to the coupling 11. Friction material can be on either the rotor 17B or stator 17C. This material is specially designed to prevent relative motion between the rotor and stator surfaces when a force is applied to the combination of alternating stators and rotors. By preventing motion between the rotors and stators, the coupling 11 is locked to the spindle 11A which prevents any motion from taking place in the planetary wheel drive.

To release the brake, hydraulic charge pressure is applied to the parking release port 20. This pressurizes the parking brake piston cavity 17N and imparts a force on the parking piston that compresses the springs 17D and allows the rotors 17B and stators 17C to separate. This allows the coupling 11 to rotate and impart motion through the system.

Figure 3:
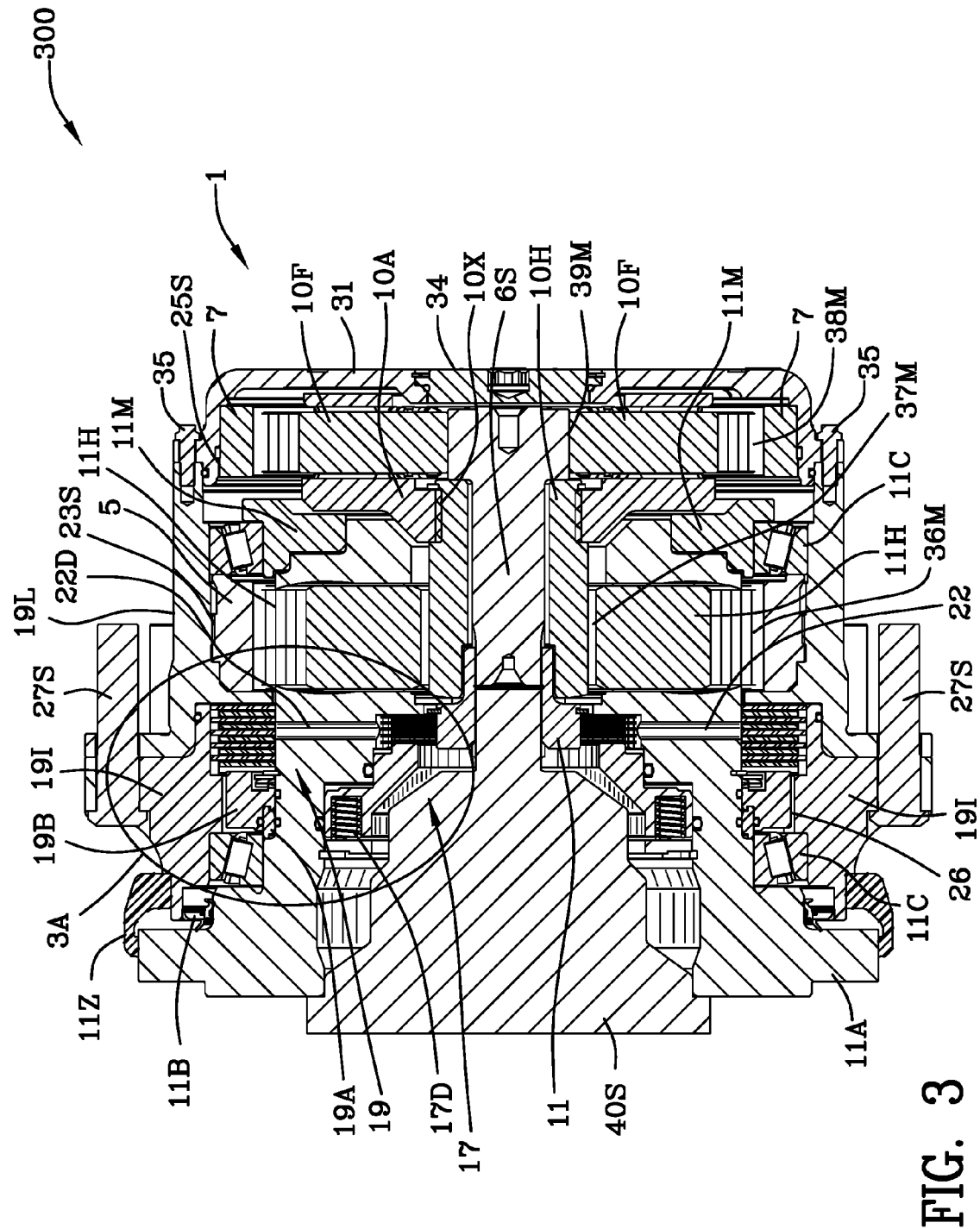
FIG. 3 is a cross-sectional view of the planetary gearbox with integral service brake taken along the lines 3-3 of FIG. 1C illustrating, inter alia, radial passageways interconnecting the parking brake and the service brake.

FIG. 3 is a cross-sectional view 300 of the planetary gearbox with integral service brake 1 taken along the lines 3-3 of FIG. 1C illustrating, inter alia, radial oil passageways 22, 22D in the stationary spindle 11A interconnecting the parking brake 17 and the service brake 19. As illustrated there are two oil passageways 22, 22D in the stationary spindle. Oil passageways 22, 22D are referred to as the first and second oil passageways, respectively. The first oil passageway 22 and the second oil passageway 22D are illustrated in FIG. 3.

Lubricated spinning objects naturally pump oil from their inside diameter to their outside diameter due to the force imparted on the fluid. The same happens within wet disc brakes. When the vehicle is moving, the parking brake 17 pumps oil from its inside diameter to its outside diameter. When the oil is pumped to the outside diameter of the parking brake disc pack it travels through oil passageways 22, 22D and supplies lubricant/oil to the service brake and heat is removed from the service brake 19. Third oil passageway 26 leads from the service brake 19 to the left most bearing 11C in FIG. 2. Also see the much larger fourth oil passageways 26A in FIG. 5B for supplying oil directly to the left most bearing 11C. Fourth oil passageways 26A comprises wide arc-shaped recesses in the intermediate hub 19I which supply lubricating oil directly to the left most bearing 11C. Third oil passageway 26 is supplied with oil from the rotor discs 19C of the service brake 19.

Fourth oil passageways 26A are illustrated in FIG. 5B. Two fourth oil passageways 26A are illustrated in FIG. 5B. However, there are actually four fourth oil passageways 26A in this example of the intermediate hub 19I illustrated in FIG. 5B. There can be more or fewer fourth oil passageways 26A if desired. Left most bearing 11C in FIG. 2 pumps oil to to oil return passageways 22A, 22B and 22C illustrated in FIG. 5A allowing oil to escape the service brake disc stack 19C, 19D to minimize parasitic losses that generate heat.

Figure 3A:
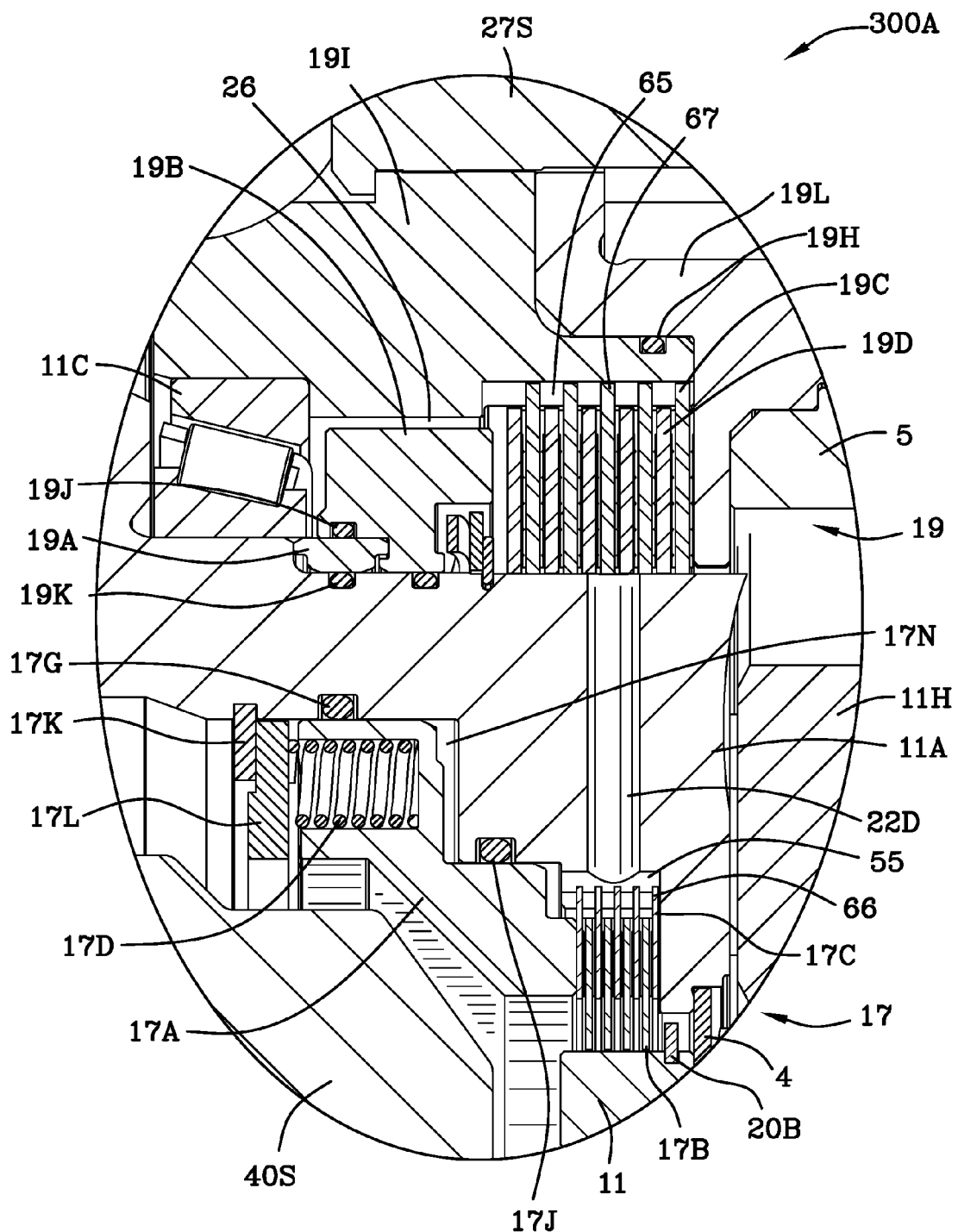
FIG. 3A is an enlargement of a portion of FIG. 3 illustrating the parking and service brake and a radial passageway in the stationary spindle interconnecting the parking brake and the service brake.
Figure 3B:
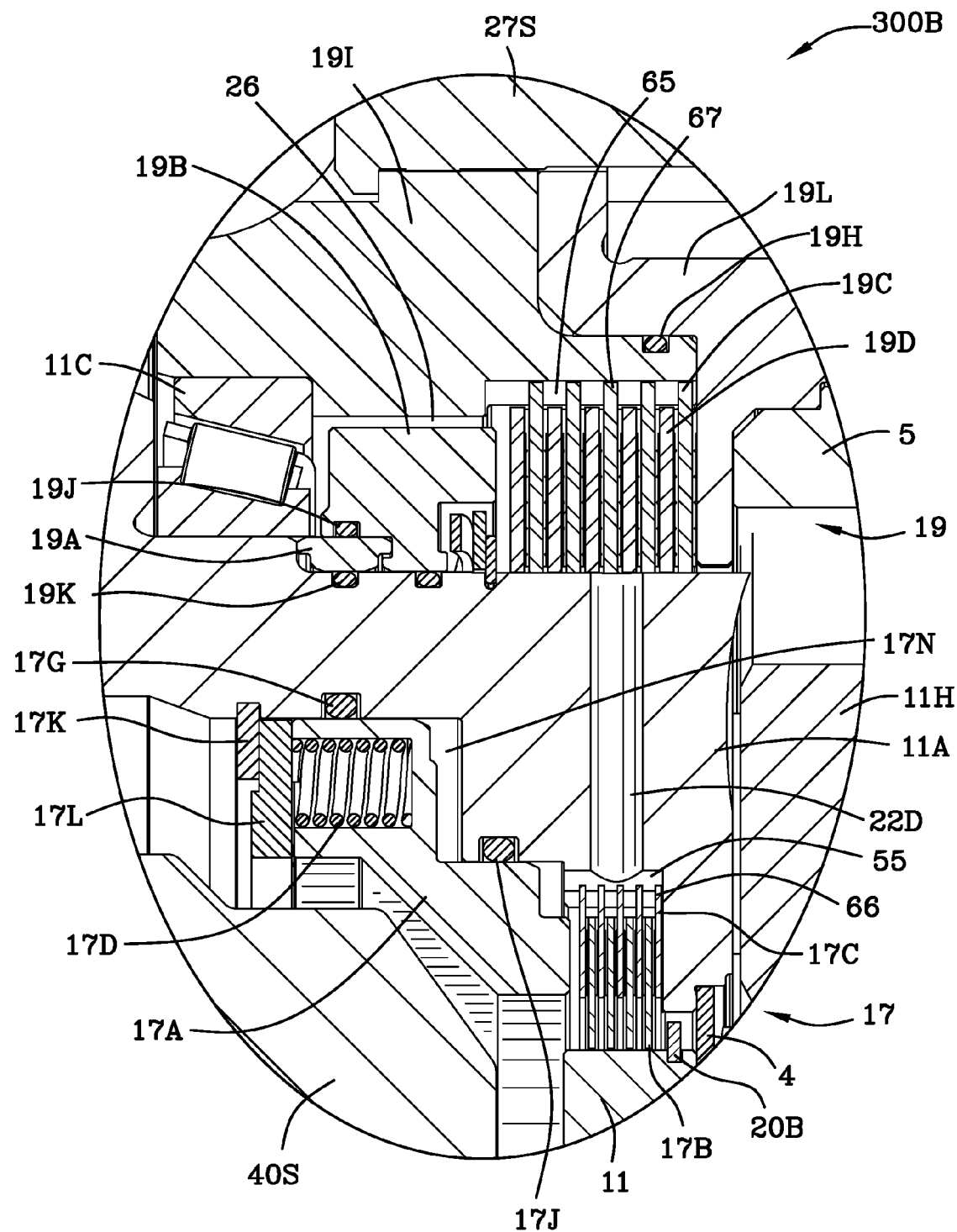
FIG. 3B is a view similar to FIG. 3A except that the parking brake is not engaged and, thus, the parking brake is supplying oil through the stationary spindle to the service brake.

Additional first and second oil passageways 22, 22D through the stationary spindle above the oil line may be added. In the example of FIGS. 3 and 3A, the parking brake 17 is actuated and no lubricating oil is being supplied to the first and second oil passageways 22, 22D in the stationary spindle.

FIG. 3A is an enlargement 300A of a portion of FIG. 3 illustrating the parking and service brake and a radial oil passageway 22D interconnecting the parking brake and the service brake.

FIG. 3B is a view similar to FIG. 3A except that the parking brake is not engaged and, thus, the parking brake 17 is supplying oil through the stationary spindle to the service brake 19 and when the vehicle is running.

Additionally, the rotor 19C at the end of the disc stack is trapped between the ring gear housing 19L and the intermediate hub 19I. Protrusions 66 in the rotor 19C at the end of the disc stack is interconnected to intermediate hub 19I via recesses 68 in the intermediate hub 19I. See FIG. 5B illustrating recesses 68 which are slightly out of phase with recesses 65 (for example, not aligned with recesses 65). This prevents the service brake 19 disc pack from being slightly engaged when running clearances are reduced as oil is pumped against the last rotor 19C in the disc stack from adjacent gear meshes 36M.

When service braking is required, the machine operator will press his or her foot onto the brake pedal. The pedal is interlocked to the hydrostatic system which creates a negative torque at the motor shaft to begin slowing down the vehicle. In addition, pressure is delivered to the service brake port 24. The pressure will depend on how far the brake pedal is pushed down by the operator's foot. The service brake port delivers pressure to the service brake cavity 19N. Due to the pressure, the service piston moves and imparts a force on the rotors 19C and stators 19D.

While braking, heat is developed due to relative motion and friction forces between the rotors 19C and stators 19D. Part of this heat is absorbed into the lubricant and adjacent components. The rest of the heat is absorbed by the brake components. The invention utilizes discs with very large inner and outer diameters that are capable of absorbing heat so that the temperature in the brake cavity does not reach a destructive level. Additionally, since the service brake 19 is located radially outwardly from the common axis of the planetary gearbox, the circumference of the service brake 19 is large. Put another way, the service brake is adjacent to and engages the hub 19I. This location maximizes the size of the brake for a given thickness as measured from the inside diameter to the outside diameter of the disc stack (rotor discs and stator discs). Additionally, the service brake enjoys a substantially reduction in angular velocity due to the large reduction of the planetary gearbox. Still additionally, since the service brake 19 is located radially outwardly from the common axis of the planetary gearbox, a considerable portion of the service brake is located below the oil line. FIG. 1 illustrates the preferred oil line on cover 31. After the braking cycle is complete, the heat will further be dissipated into the lubricants and adjacent components until the temperatures equalize.

When the brake cycle is complete, and the operator removes his or her foot from the brake pedal, the pressure is removed from the service brake cavity and the return spring 19F pushes the service piston 19B back to its original position. This allows the rotors 19C and stators 19D to regain their original clearances that they had prior to the brake cycle. Slits 19X and 19R enable cooling by controlling lubricant as it flows from inside diameter to the outside diameter of the rotor discs.

The geometry of this assembly provides several advantages. First the service brake is packaged between the main bearing 11C and output planet gear 11H in such a way that limits/prevents any effect of the overall length of the planetary gearbox assembly. The gearbox geometry also takes advantage of the natural tendency of the parking brake to pump oil to cool the service brake. Furthermore, the service brake solves the problems associated with external output brakes and internal input/intermediate multi-disc wet brakes that were previously mentioned.

REFERENCE NUMERALS 1 arrow pointing to planetary gearbox with integral service brake and parking break
4 output sun thrust washer
5 output ring gear
6 sun gear
6S input shaft of input sun gear 6
7 input ring gear
10A input planet carrier
10B input planet thrust washer
10C input stage needle bearing
10D input planet shaft
10E roll pin
10F input planet gear
10G retaining ring
10H output sun gear
10X spline connection of input planet carrier 10A and the output sun gear 10H
11 coupling
11A spindle
11B lip seal between spindle 11A and intermediate hub 19I
11C main bearing
11H output planet gear
11J, 11K output planet thrust washer 11M bearing carrier/support for one of the main bearings 11C
11N output planet shaft
11R output stage needle bearing
11S coupling spline
11Z outer boot seal for sealing between spindle 11A and intermediate hub 19I
17 arrow pointing to the parking brake
17A parking brake piston
17B parking brake rotor
17C parking brake stator
17D parking brake spring for applying the parking brake to the brake disc stack
17G, J o-ring
17K retaining ring
17L parking brake spring reaction plate
17N parking break piston cavity
17X generally spiral shaped slits in the friction material 17Z
17R generally radially shaped slits in the friction material 17Z
17Z friction material on rotor disc 17C of service brake
18 identification plate
19 arrow pointing to the service brake
19A sealing ring
19B service brake (dynamic brake) piston
19C service brake (dynamic brake) rotor
19D service brake (dynamic brake) stator
19E retaining ring
19F dynamic piston return spring
19G dynamic brake thrust washer
19H, 19J, 19K o-ring
19I intermediate hub affixed to ring gear housing 19L
19L rotatable ring gear housing/hub
19N piston cavity
19X generally spiral shaped slits in the friction material 19Z
19R generally radially shaped slits in the friction material 19Z
19Z friction material on rotor disc 19C of service brake
20 port for the supply of pressure to parking brake piston 17A
20B retaining ring-external
20C retaining ring
20P passageway in spindle 11A connecting port 20 and parking brake cavity
21 o-ring
22, 22D first and second oil passageways extending radially through stationary spindle 11A from the parking brake disc stack to the service brake disc stack
22A, 22B, 22C oil return passageways for receiving oil pumped by main bearings 11C
23S spline connection of output ring gear 5 and ring gear housing 19L
24 port for the supply of pressure to service brake piston 19B
24P passageway in spindle 11A connecting port 24 and service brake cavity
25S spline connection of input ring gear 7 and cover 30
26 third oil passageways from radial extent of service brake rotors and stators and between the service brake piston and the intermediate hub 19I
26A fourth oil passageways in the intermediate hub 19I for supplying lubricating oil directly to left most bearing 11C for pumping by the bearing
27H bolt hole in intermediate hub 19I
27S threaded studs
30 oil fill
31 cover
32 retaining ring
33 o-ring
34 disconnect plug
35 bolts affixing cover 31 to the rotating housing 19L
36M meshing of the output planet gear 11H and output ring gear 5
37M meshing of the output sun gear 10H and output planet 11H
38M meshing of the input planet 10F and the input ring gear 7
39M meshing of the input sun 6 and the input planet 10F
40S motor shaft
50 flange of spindle 11A
51 ridges on the exterior of the spindle 11A
50H holes in spindle flange 50
53 protrusions on stators 19D of service brake 19 for engagement with ridges 51 on the exterior of stationary spindle 11A
55 recess in spindle 11A for receiving protrusions 66 of stator 17C
65 recess in intermediate hub 19I for receiving protrusions 67 of rotor 19C of service brake 19
66 protrusions on stator discs 17C of parking brake which engage recesses 55 in spindle 11A
67 protrusions on rotor discs 19C which engage recesses 65 in the intermediate hub 19I for rotation therewith
68 recess in intermediate hub 19I for receiving protrusions 67 of rotor 19C of service brake 19
80G groove in coupling 11
80P protrusion of coupling 11
81G groove in rotor disc of parking brake 17
81P key on rotor disc of parking brake 17
100 perspective view of the planetary gearbox with integral service brake
100A another perspective view of the planetary gearbox with integral service brake
100B first end view of the perspective view of the planetary gearbox with integral service brake
100C second end view of the perspective view of the planetary gearbox with integral service brake
200 cross-sectional view taken along the lines 2-2 of FIG. 1C illustrating the service brake and the parking brake, and a port and a passageway supplying the parking brake piston cavity operating the parking brake piston
200A enlargement of a portion of FIG. 2 illustrating the service brake
200B enlargement of a portion of FIG. 2 illustrating the parking brake
300 cross-sectional view taken along the lines 3-3 of FIG. 1C illustrating, inter alia, radial passageways interconnecting the parking brake and the service brake
300A enlargement of a portion of FIG. 3 illustrating the parking and service brake and a radial passageway interconnecting the parking brake and the service brake
300B view similar to FIG. 3A except that the parking brake is not engaged and, thus, the parking brake is supplying oil through the stationary spindle to the service brake
400 cross-sectional view taken along the lines 4-4 of FIG. 1C illustrating, inter alia, a port and a passageway supplying the service brake piston cavity operating the service brake piston
400A enlargement of a portion of FIG. 4 illustrating the parking brake and the piston brake
400B enlargement illustrating the parking brake 17 and the service brake 19 actuated for example, and the respective rotor discs and stator discs of each brake stack are engaged.

500 perspective view of the spindle illustrating exterior ridges which prevent rotation of the stator plates operating between the spindle and the intermediate body 500A cross-sectional view of the FIG. 5 taken along the line 5A-5A 500B perspective view of the intermediate hub 19I illustrating recesses 65, 68 for engagement with protrusions 66 of the rotor discs 19C of the service brake 19

600 perspective view of the stator and rotor brake discs of the service brake stack 600A enlarged cross-sectional view of the service brake stack taken along the lines 6A-6A of FIG. 6

700 enlarged perspective view of the parking brake stack 700A enlarged cross-sectional view of the service brake stack taken along the lines 7A-7A of FIG. 7

800 perspective view of the coupling 900 diagrammatic view of the parking brake and the service brake together with the stationary spindle, the rotatable coupling and the rotatable hubs Those skilled in the art will understand that the invention has been set forth by way of example and that changes may be made to the invention as set forth herein without departing from the spirit and the scope of the claims as set forth herein.

The invention claimed is:

1. A planetary gearbox with integral service brake and with integral parking brake comprising:
    a stationary spindle;
    said integral service brake resides radially outwardly with respect to said integral parking brake;
    a first oil passageway extending radially from said integral parking brake to said integral service brake;
    a planetary gear system;
    a rotating shaft coupled to said planetary gear system;
    said planetary gear system drives a rotatable ring gear housing;
    said integral service brake operates between said stationary spindle and said rotatable ring gear housing; and,
    said integral parking brake operates between said stationary spindle and said rotating shaft coupled to said planetary gear system.

2. The planetary gearbox with integral service brake and with integral parking brake as claimed in claim 1, further comprising:
    said integral parking brake includes integral parking brake rotor discs and integral parking brake stator discs;
    said first oil passageway extending radially from said integral parking brake to said integral service brake resides in said stationary spindle and said first oil passageway extending radially from said integral parking brake to said integral service brake transfers oil from said parking brake to said integral service brake due to the rotary motion of said rotating shaft and said integral parking brake rotor discs of said integral parking brake.

3. The planetary gearbox with integral service brake and with integral parking brake as claimed in claim 2 further comprising:
    a second oil passageway extending radially from said integral parking brake to said integral service brake resides in said stationary spindle and said second oil passageway extending radially from said integral parking brake to said integral service brake transfers oil from said integral parking brake to said integral service brake due to the rotary motion of said rotating shaft and said integral parking brake rotor discs of said integral parking brake.

4. The planetary gearbox with integral service brake and with integral parking brake as claimed in claim 1, further comprising:
    an intermediate hub affixed to said rotatable ring gear housing;
    said integral service brake includes integral service brake rotor discs affixed to said intermediate hub and rotatable therewith;
    said service brake hub includes integral service brake stator discs affixed to said stationary spindle;
    an input drive shaft and an input sun gear;
    a coupling interconnecting said input drive shaft and said input sun gear;
    said integral parking brake includes integral parking brake rotor discs affixed to said coupling and rotatable therewith;
    and, said integral parking brake includes integral parking brake stator discs affixed to said stationary spindle.

5. The planetary gearbox with integral service brake and with integral parking brake as claimed in claim 1, further comprising:
    said integral service brake includes integral service brake stator discs and integral service brake rotor discs;
    said integral service brake stator discs and said integral service brake rotor discs comprise integral service brake disc stack;
    a pressure operated, spring-released, service piston engaging said integral service brake disc stack upon the application of pressure to said service piston;
    said integral parking brake includes integral parking brake stator discs and integral parking brake rotor discs;
    said integral parking brake stator discs and said integral parking brake rotor discs comprise integral parking brake disc stack; and,
    a spring operated, pressure-released, brake piston engaging said integral parking brake disc stack upon the absence of pressure to said brake piston.

6. A planetary gearbox with integral service brake comprising:
    a stationary spindle;
    a planetary gear system;
    a rotating shaft coupled to said planetary gear system and, said rotating shaft drives said planetary gear system;
    said planetary gear system drives a rotatable ring gear housing, and, said rotatable ring gear housing includes a hub;
    an integral parking brake;
    a first oil passageway in said stationary spindle extending radially providing oil from said integral parking brake to said integral service brake; and,
    said integral service brake operates between and engages said stationary spindle and said rotatable ring gear housing including said hub.

7. The planetary gearbox with integral service brake as claimed in claim 6, further comprising:
    said integral parking brake provides oil to said first oil passageway in said stationary spindle extending radially to said integral service brake when said integral parking brake is not active.

8. The planetary gearbox with integral service brake as claimed in claim 7 further comprising:
    a second oil passageway in said stationary spindle extending radially providing oil to said integral service brake; and,
    said integral parking brake provides oil to said second oil passageway in said stationary spindle extending radially to said integral service brake when said integral parking brake is not active.

9. The planetary gearbox with integral service brake as claimed in claim 6, further comprising:
said integral parking brake includes integral parking brake rotor discs and integral parking brake stator discs;
said integral parking brake rotor discs of said integral parking brake provide oil to said first oil passageway in said stationary spindle extending radially to said integral service brake when said integral parking brake is not active.

10. The planetary gearbox with integral service brake as claimed in claim 6, further comprising:
an oil reservoir;
said spindle includes an oil return passageway;
a service piston for releasing said integral service brake;
an oil passageway formed between said service piston and said hub of said ring gear housing;
a main bearing between said stationary spindle and said hub of said ring gear housing;
said integral service brake provides oil to said oil passageway formed between said service piston and said hub of said ring gear housing; and,
said main bearing pumping said oil from said oil passageway to said oil return passageway into said oil reservoir.

11. The planetary gearbox with integral service brake as claimed in claim 10, further comprising:
said integral parking brake includes integral parking brake rotor discs and integral parking brake stator discs;
said rotor discs of said integral parking brake provide oil to said first oil passageway in said stationary spindle extending radially to said integral service brake when said parking brake is not active.

12. The planetary gearbox with integral service brake as claimed in claim 6, further comprising:
an intermediate hub affixed to said rotatable ring gear housing;
said integral service brake includes integral service brake rotor discs affixed to said intermediate hub and rotatable therewith;
said integral service brake includes integral service brake stator discs affixed to said stationary spindle;
said integral parking brake includes integral parking brake rotor discs affixed to said rotating shaft and said integral parking brake includes integral parking brake stator discs affixed to said stationary spindle;
said rotor discs of said integral parking brake provide oil to said first oil passageway in said stationary spindle extending radially to said integral service brake when said integral parking brake is not active.

13. The planetary gearbox with integral service brake as claimed in claim 12, further comprising:
a second oil passageway in said stationary spindle extending radially providing oil to said integral service brake; and,
said integral parking brake rotor discs of said integral parking brake provide oil to said second oil passageway in said stationary spindle extending radially to said integral service brake when said integral parking brake is not active.

14. The planetary gearbox with integral service brake as claimed in claim 12, further comprising:
said integral service brake stator discs and said integral service brake rotor discs comprise an integral service brake disc stack;

a pressure operated, spring-released, service piston engaging said integral service brake disc stack upon the application of pressure to said service piston;
said integral parking brake stator discs and said integral parking brake rotor discs comprise an integral parking brake disc stack; and,
a spring operated, pressure-released, brake piston engaging said integral parking brake disc stack upon the absence of pressure to said brake piston.

15. A planetary gearbox with integral service brake comprising:
said planetary gearbox and said integral service brake have a common axis;
a stationary spindle;
said integral service brake includes integral service brake rotor discs and integral service brake stator discs, said integral service brake rotor discs include an outer diameter and an inner diameter, said integral service brake stator discs include an outer diameter and an inner diameter, and said integral service brake rotor discs and said integral service brake stator discs include a surface area as determined by said inner and outer diameters of said integral service brake rotor discs and said integral service brake stator discs with respect to said common axis, respectively;
said integral service brake resides radially outwardly with respect to said common axis;
means for picking up oil in communication with a first oil passageway;
said first oil passageway in said stationary spindle extending radially therethrough to said integral service brake;
a planetary gear system;
a rotating shaft coupled to said planetary gear system;
said planetary gear system drives a rotatable ring gear housing; and,
said integral service brake operates between said stationary spindle and said rotatable ring gear housing.

16. A planetary gearbox with integral service brake as claimed in claim 15, further comprising:
said integral service brake rotor discs of said integral service brake include friction material thereon;
said integral service brake rotor discs include first and second side surfaces; and,
said first and second side surfaces of said integral service brake rotor discs include grooves therein for more efficient use of lubricating oil and heat dissipation.

17. A planetary gearbox with integral service brake as claimed in claim 15, further comprising:
said integral service brake stator discs of said integral service brake include friction material thereon;
said integral service brake stator discs include first and second side surfaces; and,
said first and second sides of said integral service brake stator discs include grooves therein for more efficient use of lubricating oil and heat dissipation.

18. A planetary gearbox with integral service brake and with integral parking brake comprising:
a stationary spindle;
said integral service brake resides radially outwardly with respect to said integral parking brake conserving axial space;
a first oil passageway extending radially from said integral parking brake to said integral service brake;
a planetary gear system;
a rotating shaft coupled to said planetary gear system;
said planetary gear system drives a rotatable ring gear, said rotatable ring gear affixed to a rotatable housing;

said integral service brake operates between said stationary spindle and said rotatable ring gear housing; and, said integral parking brake operates between said stationary spindle and said rotating shaft coupled to said planetary gear system.

19. A planetary gearbox with integral service brake and with integral parking brake as claimed in claim 18, further comprising:

said rotatable ring gear includes a pitch diameter;

said integral service brake includes an inside diameter which is larger than 0.5 times said pitch diameter of said rotatable ring gear.

20. A planetary gearbox with integral service brake comprising:

a stationary spindle;

a planetary gear system;

a rotating shaft coupled to said planetary gear system;

said integral service brake resides radially outwardly with respect to an integral parking brake;

said planetary gear system drives an output rotatable ring gear housing/hub, said output rotatable ring gear housing/hub being cylindrically shaped and being the output of said gearbox; and, said integral service brake operates between said stationary spindle and said output rotatable ring gear housing/hub.

21. A planetary gearbox with integral service brake as claimed in claim 20 further comprising:

said planetary gear system includes a rotating input shaft and said output rotatable ring gear housing/hub;

said planetary gear system includes a reduction in angular velocity between said rotating input shaft and said output rotatable ring gear housing/hub; and, said integral service brake includes integral service brake rotor discs and integral service brake stator discs, and, said integral service brake rotor discs and said integral service brake stator discs include a surface area; and, said outside diameters of said integral service brake rotor discs are keyed to said output rotatable ring gear housing/hub.

22. A planetary gearbox with integral service brake as claimed in claim 21 wherein said integral service brake rotor discs of said service brake include spiral shaped slits and radial slits to enhance use of lubricating oil as a coolant and wherein said integral service brake discs keyed to said output rotatable ring gear having a surface area are submersed in lubricating oil in a reservoir.

23. A planetary gearbox with integral service brake comprising:

a stationary spindle;

a planetary gear system;

a rotating shaft coupled to said planetary gear system and, said rotating shaft drives said planetary gear system;

said planetary gear system drives a rotatable ring gear housing, and, said rotatable ring gear housing includes a hub;

means for picking up oil in communication with a first oil passageway;

said first oil passageway in said stationary spindle extending radially providing oil to said integral service brake;

said integral service brake operates between and engages said stationary spindle and said rotatable ring gear housing including said hub;

said hub includes an arc-shaped oil passageway therein in communication with service brake and a main bearing, and, said main bearing resides between said stationary spindle and said hub.

24. A planetary gearbox with integral service brake as claimed in claim 23, further comprising:

said means for picking up oil in communication with a first oil passageway additionally in communication with a second oil passageway;

said second oil passageway in said stationary spindle extending radially providing oil to said integral service brake.

25. A planetary gearbox with integral service brake as claimed in claim 24, further comprising:

a service piston;

an oil reservoir;

a third oil passageway formed between said service piston and said hub of said ring gear housing;

said main bearing between said stationary spindle and said hub of said ring gear housing;

said integral service brake provides oil to said third oil passageway formed between said service piston and said hub of said ring gear housing; and, said main bearing pumping said oil from said third oil passageway to an oil return passageway into said oil reservoir.

26. A planetary gearbox with integral service brake as claimed in claim 23, further comprising:

an oil reservoir;

said integral service brake provides oil to said fourth arc-shaped oil passageway formed in said hub of said ring gear housing; and, said main bearing pumping said oil from said fourth oil passageway to an oil return passageway into said oil reservoir.

\* \* \* \* \*